United States Patent [19]

Stiliadis et al.

[11] Patent Number: 6,134,217
[45] Date of Patent: Oct. 17, 2000

[54] TRAFFIC SCHEDULING SYSTEM AND METHOD FOR PACKET-SWITCHED NETWORKS WITH FAIRNESS AND LOW LATENCY

[75] Inventors: Dimitrios Stiliadis; Anujan Varma, both of Santa Cruz, Calif.

[73] Assignee: The Regents of the University of California, Oakland, Calif.

[21] Appl. No.: 08/632,680

[22] Filed: Apr. 16, 1996

Related U.S. Application Data

[63] Continuation-in-part of application No. 08/634,904, Apr. 15, 1996, Pat. No. 5,859,835.

[51] Int. Cl.⁷ .................................................. H04L 12/56
[52] U.S. Cl. ......................... 370/232; 370/252; 370/417; 370/428
[58] Field of Search .................................... 370/230, 232, 370/233, 234, 252, 253, 395, 396, 397, 398, 399, 401, 409, 412, 415, 416, 417, 418, 428, 429; 395/200.57, 200.58, 200.62, 200.63, 200.64, 200.65; 709/227, 228, 232, 233, 234, 235

[56] References Cited

U.S. PATENT DOCUMENTS

| | | | |
|---|---|---|---|
| 4,779,267 | 10/1988 | Limb | 370/232 |
| 4,866,702 | 9/1989 | Shimizu et al. | 370/438 |
| 5,038,347 | 8/1991 | Courtois | 370/440 |
| 5,241,536 | 8/1993 | Grimble et al. | 370/398 |
| 5,253,247 | 10/1993 | Hirose et al. | 370/232 |
| 5,260,935 | 11/1993 | Turner | 370/394 |
| 5,337,308 | 8/1994 | Fan | 370/388 |
| 5,339,311 | 8/1994 | Turner | 370/394 |
| 5,355,372 | 10/1994 | Sengupta et al. | 370/367 |

(List continued on next page.)

OTHER PUBLICATIONS

Zhang, L., "VirtualClock: A New Traffic Control Algorithm for Packet–Switched Networks", ACM Transactions on Computer Systems, vol. 9, No. 2, May 1991, pp. 101–124.

Demers et al., "Analysis and Simulation of a Fair Queueing Algorithm", Internetworking: Research and Experience, vol. 1, No. 1, 1989, pp. 3–26.

Golestani, S., "A Self–Clocked Fair Queueing Scheme for Broadband Applications", Proceedings of INFOCOM '94, IEEE, Apr. 1994, pp. 636–646.

Davin et al., "A Simulation Study of Fair Queueing and Policy Enforcement", Computer Communication Review, vol. 20, Oct. 1990, pp. 23–29.

*Primary Examiner*—Chi H. Pham
*Assistant Examiner*—Kwang B. Yao
*Attorney, Agent, or Firm*—John P. O'Banion

[57] ABSTRACT

A traffic scheduling system and method are disclosed for providing quality-of-service (QoS) guarantees in a packet-switched communication network where multiple traffic sessions share an outgoing communication link of a network switch in such a way that a certain minimum rate is reserved for each session sharing the link. The method can be applied to both general communication networks supporting variable packet sizes and Asynchronous Transfer Mode (ATM) networks with a fixed packet (cell) size. A packet arriving for transmission on an outgoing link of the switch is assigned a timestamp and placed in a priority queue in the order of increasing timestamps so that the packet with the smallest timestamp is placed at the head of the queue. The timestamp is computed based on a system potential maintained by the system, that tracks the progress of work in the system. The system potential is maintained at zero when no packets are queued at the outgoing link, and increases progressively as packets are transmitted. In addition to the timestamps, a starting potential is also calculated on arrival of each packet, and the starting potentials of queued packets are maintained in a separate priority queue, in the order of increasing starting potentials so that the smallest starting potential value appears at the head of the queue. This smallest starting potential is used to recalibrate the system potential at the end of transmission of each packet, by setting the system potential to the smallest starting potential.

33 Claims, 28 Drawing Sheets

U.S. PATENT DOCUMENTS

| | | | |
|---|---|---|---|
| 5,381,407 | 1/1995 | Chao | 370/233 |
| 5,390,184 | 2/1995 | Morris | 370/353 |
| 5,394,395 | 2/1995 | Nagai et al. | 370/395 |
| 5,428,616 | 6/1995 | Field et al. | 370/253 |
| 5,455,826 | 10/1995 | Ozveren et al. | 370/232 |
| 5,515,363 | 5/1996 | Ben-Nun et al. | 370/232 |
| 5,533,020 | 7/1996 | Bryn et al. | 370/395 |
| 5,535,201 | 7/1996 | Zheng | 370/231 |
| 5,579,302 | 11/1996 | Banks | 370/397 |
| 5,640,389 | 6/1997 | Masaki et al. | 370/418 |
| 5,649,110 | 7/1997 | Ben-Nun et al. | 370/351 |
| 5,699,519 | 12/1997 | Shiobara | 395/200.65 |
| 5,724,513 | 3/1998 | Ben-Nun et al. | 1/1 |
| 5,729,529 | 3/1998 | Martinsson | 370/235 |
| 5,754,529 | 5/1998 | Heiss | 370/232 |

FIG. − 4

Retrieve Connection Identifier from header of packet
1. $i \leftarrow$ Connection-Identifier of packet;

Calculate current value of system potential.
Let $t$ be the current time and $t_S$ the time when
the packet currently in transmission started its service
2. $temp \leftarrow P + (t - t_S)$ Calculate the starting potential of the new packet
3. $SP(i,k) \leftarrow \max(TS(i,k-1), temp)$ Calculate timestamp of packet
4. $TS(i,k) \leftarrow SP(i,k) + length(i,k) / \rho_i$ 5. Add packet to Packet Queue prioritized by timestamp value 6. Add entry to SP queue prioritized by starting potential value

FIG. – 10

1. Delete entry in SP Queue corresponding to the transmitted packet

Increase system potential by the transmission time of the cell just completed
2. $P \leftarrow P + K$ Perform system-potential update operation
Let $SP_{min}$ be the minimum starting-potential value in the SP Queue 3. $P \leftarrow \max(P, SP_{min})$
4. Retrieve cell from head of Cell Queue and transmit

FIG. – 11

Retrieve Connection Identifier from header of cell
1. $i \leftarrow$ Connection-Identifier of cell;

Calculate the starting potential of the new cell
2. $SP(i,k) \leftarrow \max(TS(i,k-1),P)$ Calculate timestamp of cell
3. $TS(i,k) \leftarrow SP(i,k) + K/\rho_i$ 4. Add cell to Cell Queue prioritized by timestamp value
5. Add entry to SP Queue prioritized by starting potential value

FIG. – 16

1. Delete entry in SP Queue corresponding to the transmitted cell

Increase system potential by the transmission time of the cell just completed
2. $P \leftarrow P + K$ Perform system-potential update operation
Let $SP_{min}$ be the minimum starting-potential value in the SP Queue 3. $P \leftarrow \max(P, SP_{min})$
4. Retrieve cell from head of Cell Queue and transmit

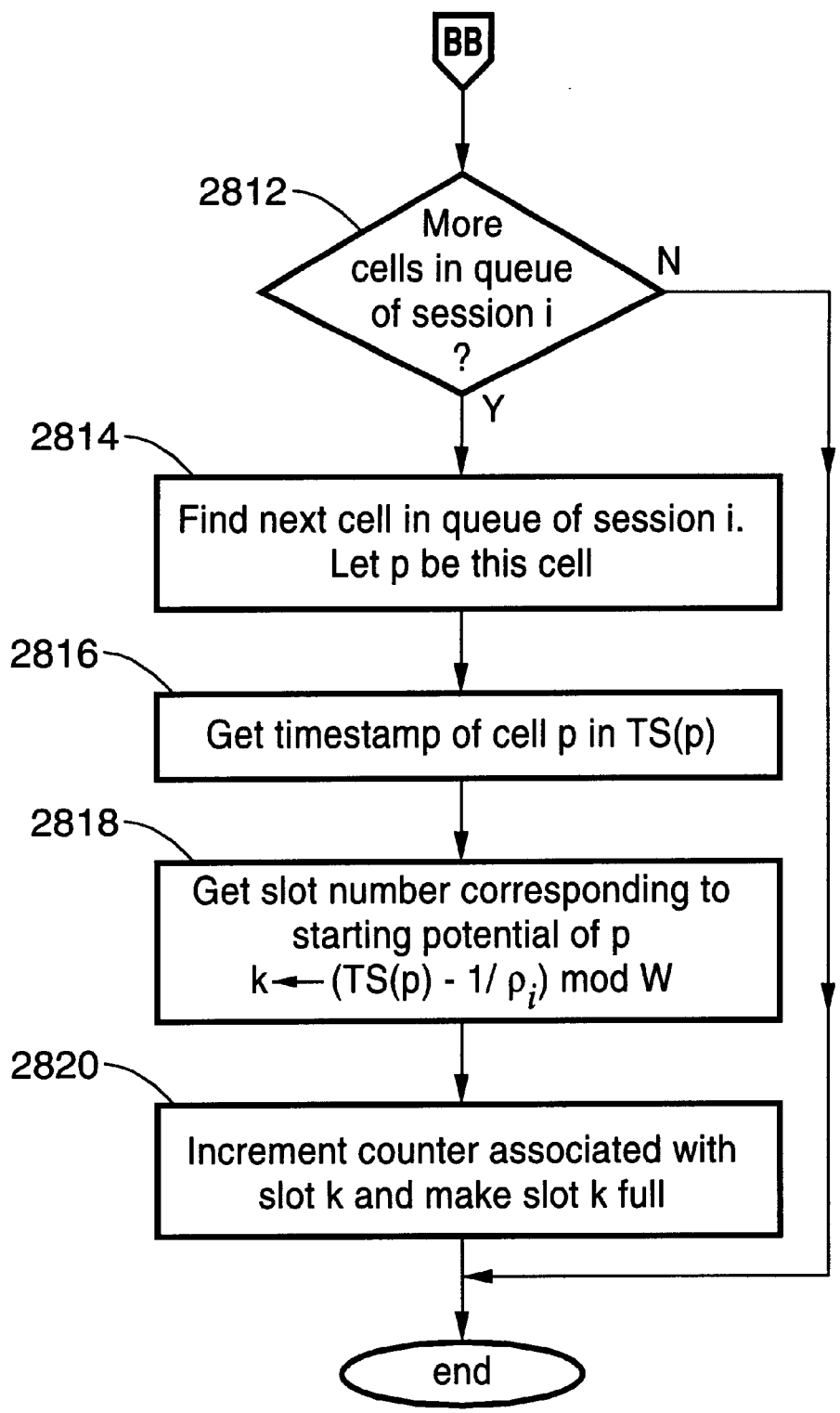
FIG. — 28B

TRAFFIC SCHEDULING SYSTEM AND METHOD FOR PACKET-SWITCHED NETWORKS WITH FAIRNESS AND LOW LATENCY

CROSS-REFERENCE TO RELATED APPLICATIONS

This application is a continuation-in-part of application Ser. No. 08/634,904 filed on Apr. 15, 1996, now U.S. Pat. No. 5,859,835.

FIELD OF THE INVENTION

The present invention is related generally to traffic scheduling systems for packet-switched communications networks and more particularly to a method and system for carrying out such traffic scheduling in a packet switch so as to provide Quality-of-Service (QoS) guarantees for network applications.

BACKGROUND OF THE INVENTION

Many future applications of computer networks such as distance education, remote collaboration, and teleconferencing will rely on the ability of the network to provide Quality-of-Service (QoS) guarantees. These guarantees are usually in the form of bounds on end-to-end delay of the session, bandwidth, delay jitter (variation in delay), packet loss rate, or a combination of these parameters. Broadband packet networks based on ATM (Asynchronous Transfer Mode) are currently enabling the integration of traffic with a wide range of QOS requirements within a single communication network. QoS guarantees can also be provided in conventional packet networks by the use of proper methods in the packet switches (or routers).

Providing QoS guarantees in a packet network requires the use of traffic scheduling methods in the switches (or routers). The function of a scheduling algorithm is to select, for each outgoing link of the switch, the packet to be transmitted in the next cycle from the available packets belonging to the communication sessions sharing the output link. This selection must be performed such that the QoS guarantees for the individual traffic sessions, such as upper bounds on maximum delay, are satisfied. Implementation of the method may be in hardware or software. Because of the small size of the ATM cell, the scheduling method must usually be implemented in hardware in an ATM switch. In a packet network with larger packet-sizes, such as the current Internet, the method can be implemented in software.

In the following, a "packet" will be referred to in the general sense as a variable size protocol data unit generated by any protocol, and a "cell" as the 53-byte protocol data unit as defined in the ATM standards. As far as the scheduling method is concerned, the cell is a special case of a packet.

A traffic scheduling method should possess several desirable features to be useful in practice:

1. Isolation of flows: The method must isolate an end-to-end session from the undesirable effects of other (possibly misbehaving) sessions. That is, the method must be able to maintain the QoS guarantees for a session even in the presence of other misbehaving flows. Note that isolation is necessary even when policing mechanisms are used to shape the flows at the entry point of the network, as the flows may accumulate burstiness within the network. Here, burstiness refers to the behavior of session traffic where its actual rate of arrival during a specific interval of time is larger than its average rate. Thus, a high burstiness generally implies a large number of packets arriving close together in time, with long idle intervals in between.

2. Low end-to-end delays: The method must provide end-to-end delay guarantees for individual sessions. In particular, it is desirable that the end-to-end delay of a session depends only on its bandwidth reservation, and is independent of the behavior of other sessions.

3. Efficient control of end-to-end delays and buffer requirements through the allocated bandwidth. It must be possible to adjust the per-link queueing delays and buffer requirements in the network nodes by adjusting the bandwidth reserved by an application. This enables applications to trade off the Quality of Service needed with the cost, thus allowing the network to support a wide range of applications with different QoS/cost requirements.

4. Utilization: The method must utilize the link bandwidth efficiently.

5. Fairness: The available link bandwidth must be divided among the connections sharing the link in a fair manner. Two scheduling methods with the same maximum delay guarantee may have significantly different fairness characteristics. An unfair scheduling method may offer widely different service rates to two connections with the same reserved rate over a given interval of time.

6. Simplicity of implementation: The scheduling method must have a simple implementation. In an ATM network, the available time for completing a scheduling decision is very short. At SONET OC-3 speed (approximately 155 Mbits/second), the transmission time of a cell is less than 3 $\mu$s. For higher speeds the available time is even less. This forces a hardware implementation. In packet networks with larger packet sizes and/or lower speeds, a software implementation may be adequate, but scheduling decisions must still be made at a rate close to the arrival rate of packets.

7. Scalability: The method must perform well in switches with a large number of connections, as well as over a wide range of link speeds.

Several methods have been proposed in the literature for traffic scheduling in packet switches. In general schedulers can be classified as work-conserving or non-work-conserving. A scheduler is work-conserving if the server is never idle when a packet is buffered in the system. A non-work-conserving server may remain idle even if there are available packets to transmit. A scheduler may, for example, postpone the transmission of a packet when it expects a higher-priority packet to arrive soon, even though it is currently idle. When the transmission time of a packet is short, as is typically the case in an ATM network, however, such a policy is seldom justified. Non-work-conserving methods are also used to control delay jitter by delaying packets that arrive early. Work-conserving schedulers always have lower average delays than non-work-conserving servers and are therefore preferred for most applications.

Examples of work-conserving schedulers include Generalized Processor Sharing (GPS), Weighted Fair Queueing, VirtualClock, Delay-Earliest-Due-Date (Delay-EDD), Weighted Round Robin, and Deficit Round Robin. Examples for non-work-conserving schedulers include Stop-and-Go queueing, Jitter-Earliest-Due-Date and Hierarchial Round Robin. Another classification of traffic schedulers is based on their internal architecture: This classification gives rise to two types of schedulers—sorted-priority and frame-based. Sorted-priority schedulers maintain a global variable—usually referred to as the virtual time—associated with each outgoing link of the switch. Each time a packet arrives or gets serviced, this variable is updated. A timestamp, computed using this variable, is associated with each packet in the system. Packets are sorted based on their timestamps, and are transmitted in that order. VirtualClock, Weighted Fair Queueing, and Delay-EDD follow this architecture.

Two factors determine the implementation complexity of all sorted-priority algorithm: First, the complexity of updating the priority list and selecting the packet with the highest priority is at least O(log V) where V is the number of connections sharing the outgoing link. The second is the complexity of calculating the timestamp associated with each packet; this factor depends heavily on the algorithm. For example, maintaining the virtual time in Weighted Fair Queueing requires the processing of a maximum of V events during the transmission of a single packet, whereas timestamps in VirtualClock can be calculated in constant time, that is O (1).

In a frame-based scheduler, time is split into frames of fixed or variable length. Reservations of sessions are made in terms of the maximum amount of traffic the session is allowed to transmit during a frame period. Hierarchical Round Robin and Stop-and-Go Queueing are frame-based schedulers that use a constant frame size. As a result, the server may remain idle if sessions transmit less traffic than their reservations over the duration of a frame, making them non-work-conserving. In contrast, Weighted Round Robin and Deficit Round Robin schedulers allow the frame size to vary within a maximum. Thus, if the traffic from a session is less than its reservation, a new frame can be started early. Therefore, both Weighted Round Robin and Deficit Round Robin are work-conserving schedulers.

Many different scheduling methods have been proposed to approximate the theoretical scheduling discipline known as Generalized Processor Sharing (GPS). The GPS discipline is defined with respect to a "fluid model," where data transmitted by each session is considered to be infinitely divisible and multiple sources may transmit their data simultaneously through a single physical communication link. This allows tight control of the bandwidth allocated to each session on a link.

Unfortunately, GPS is only a hypothetical scheduling discipline: In practice, the packets transmitted by each session cannot be divided further, and data from multiple sessions can be interleaved only at packet boundaries. Thus, the GPS discipline cannot be implemented in practice in a packet-switched network.

However, the GPS discipline provides a sound theoretical basis for the design of practical scheduling methods. A number of such practical methods have been designed based on GPS. These methods vary in their end-to-end delay bounds (that is, the maximum delays seen by packets from a particular session in the network between its end nodes), the level of fairness achieved in allocating bandwidth to different sessions sharing the same communication links, and the complexity of implementing them in a switch or router. An outline of the GPS scheduling discipline is given below.

Assume that the GPS discipline is used to schedule traffic on an outgoing link of a switch. The share of bandwidth reserved by session i on the outgoing link is represented by a real number $\phi_i$. Let $B(\tau, t)$ denote the set of sessions that are backlogged during the interval $(\tau, t)$. That is, $B(\tau, t)$ is the set of sessions that have at least one packet in the switch at all times during the interval $(\tau, t)$. If r is the bandwidth capacity of the outgoing link, the service offered to a session i, denoted by $W_i(\tau, t)$, is proportional to $\phi_i$. That is, $$W_i(\tau, t) \geq \frac{\phi_i}{\sum_{j \in B(\tau, t)} \phi_j} r(t - \tau)$$

The minimum service that a connection can receive in any interval of time is $$\frac{\phi_i}{\sum_{j=1} \phi_j} r(t - \tau)$$

where V is the maximum number of connections that can be backlogged in the server at the same time. Thus, GPS serves each backlogged session with a minimum rate equal to its reserved rate at each instant; in addition, the excess bandwidth available from sessions not using their reservations is distributed among all the backlogged connections at each instant in proportion to their individual reservations. This results in perfect isolation, ideal fairness, and low end-to-end session delays. What is meant by end-to-end session delay is the delay experienced by a packet between the time a packet leaves a source and the time it is received at its destination.

A packet-by-packet version of GPS, known as PGPS or Weighted Fair Queueing, was defined in A. Demers, S. Keshav, and S. Shenker, "Analysis and simulation of a fair queueing algorithm," *Internetworking: Research and Experience,* vol. 1, no. 1, pp. 3–26, 1990. Since our method attempts to overcome a serious shortcoming of Weighted Fair Queueing, this algorithm will be explained first. It can be assumed that each traffic session i sharing the output link controlled by the scheduling algorithm is assigned a value $\phi_i$ corresponding to the reserved bandwidth of the session. The values $\phi_i$ are computed such that the reserved bandwidth of session i on the link is given by $$\frac{\phi_i}{\sum_{j=1}^{V} \phi_j}$$

where the denominator computes the sum of the $\phi_i$ values for all the sessions sharing the link.

In the Weighted Fair Queueing algorithm, a GPS fluid-model system is simulated in parallel with the actual packet-by-packet system, in order to identify the set of connections that are backlogged at each instant of time and their service rates. Based on this information, a timestamp is calculated for each arriving packet, and the packets are inserted into a priority queue based on their timestamp values. To accomplish the timestamp calculation, a virtual time function v(t) is maintained by the scheduler. The virtual time v(t) is a piecewise linear function of the real time t, and its slope changes depending on the number of busy sessions and their service rates. More precisely, if $B(\tau,t)$ represents the set of backlogged connections in the scheduler during the interval $(\tau,t)$, the slope of the virtual time function during the interval $(\tau,t)$ is given by $$\frac{1}{\sum_{i \in B(\tau,t)} \phi_i}$$

The term "backlogged" here means that the session has one or more packets buffered in the switch throughout the time interval under consideration.

Upon the arrival of a new packet, the virtual time v(t) must first be calculated. Then, the timestamp associated with the k-th packet of session i is calculated as:

$$TS_i^k \leftarrow \max(TS_i^{k-1}, v(t)) + \frac{L}{\phi_i}$$

where $TS_i^{k-1}$ is the timestamp of the previous packet of session i, L is the size of the k-th packet, and $\phi_i$ is the share of the bandwidth reserved by session i.

A serious limitation of the Weighted Fair Queueing algorithm is its computational complexity arising from the simulation of the fluid-model GPS scheduler that is required for computation of the virtual time v(t). If there is a total of V sessions sharing the outgoing link, a maximum of V events may be triggered in the simulation during the transmission time of a single packet Thus, the time for completing a scheduling decision is O(V). When the number of sessions sharing the outgoing link is large, this computation time can be prohibitive. In particular, the algorithm is difficult to apply in an ATM switch where the transmission time of a cell is small (approximately 2.7 microseconds with 155.5 Mbits/second link speed). The method disclosed here provides results similar to those of Weighted Fair Queueing, but its implementation complexity is O(1).

A method to reduce the complexity of Weighted Fair Queueing, using an approximate implementation of GPS multiplexing, was proposed in J. Davin and A. Heybey, "A simulation study of fair queueing and policy enforcement," *Computer Communication Review*, vol. 20, pp. 23–29, October 1990, and was later analyzed in S. Golestani, "A self-clocked fair queueing scheme for broadband applications," in *Proceedings of IEEE INFOCOM '94*, pp. 636–646, April 1994, under the name Self-Clocked Fair Queueing (SCFQ).

In this implementation, the virtual time function v(t) is approximated using the timestamp of the packet currently in service. Let $TS_{current}$ denote the timestamp of the packet currently in service when a new packet arrives, and let the new packet be the k-th packet of session i. Then, the timestamp of the new packet is calculated as $$TS_i^k = \max(TS_{current}, TS_i^{k-1}) + \frac{L}{\phi_i}$$

where $TS_i^{k-1}$ is the timestamp of the previous packet of session i, L is the size of the k-th packet, and $\phi_i$ is the share of the bandwidth reserved by session i. This approach reduces the complexity of the method greatly. However, the price paid is the reduced level of isolation among the sessions, causing the end-to-end delay bounds to grow linearly with the number of sessions that share the outgoing link. Recall that the end-to-end session delay is the delay experienced by a packet between the time the packet leaves the source and the time it is received at its destination. Thus, the worst-case delay of a session can no longer be controlled just by controlling its reservation, as is possible in Weighted Fair Queueing. The higher end-to-end delay also affects the burstiness of sessions within the network, increasing the buffer requirements.

Another well-known scheduling method is VirtualClock, described in L. Zhang, "VirtualClock: a new traffic control algorithm for packet switching networks," ACM Transactions on Computer Systems, vol.9, pp.101–124, May 1991. This method provides the same end-to-end delay and burstiness bounds as those of Weighted Fair Queueing with a simple timestamp computation algorithm, but the price paid is in terms of fairness. A backlogged session in the VirtualClock server can be starved for an arbitrary period of time as a result of excess bandwidth it received from the server when other sessions were idle.

What is needed therefore is a scheduling system and method for packet switch network that allows for fairness and low latency for the packets in the network. The system and method should be easily implemented utilizing existing architecture. It should be less complex than existing scheduling methods for such scheduling. The present invention addresses such a need.

SUMMARY OF THE INVENTION

A traffic scheduling method and system for packet-switched communications networks is disclosed. The method and system provides low end-to-end delay bounds and low buffer requirements to the individual traffic sessions sharing an outgoing link of a packet switch, and, at the same time, guarantees a fair distribution of the link bandwidth among the sessions sharing the link. The method and system in accordance with the present invention is timestamp-based and is work-conserving. The method and system in accordance with the present invention provides lower delay for traffic sessions as compared to Self-Clocked Fair Queueing. It provides implementation complexity similar to that of Self-Clocked Fair Queueing, but still maintains the delay bound of Weighted Fair Queueing.

The method and system is used to control the transmission of packets (or cells in the case of ATM) on an outgoing link of a switch (or router), where a certain minimum rate is reserved for each session sharing the link. The method and system in accordance with the present invention of the invention determines how packets are selected from the different sessions that share the same outgoing link in such way that each session will receive bandwidth at least equal to the reserved, and the maximum end-to-end delay of the session will be close to optimal even when traffic from some of the other sessions exceed their reservations. The method and system uses a timestamp-based approach where a timestamp is calculated for each arriving packet and packet transmissions are ordered by increasing timestamp values. The method and system maintains a function, called the system potential that is associated with each outgoing link. In addition, it determines how the timestamp is calculated when a packet arrives at the switch.

Packets destined to the same outgoing link are sorted according to their timestamps. The packet with the lowest timestamp is selected for transmission. Furthermore, a hardware system is described where the above method is implemented without being necessary to sort the packets. The system uses a set of memory elements, each associated with a timestamp value. An efficient method and system is presented for selecting the packet with the lowest timestamp.

In summary, the present invention presents a scheduling system that combines the end-to-end delay bound and buffer requirements of PGPS, simple timestamp computations, and bounded unfairness.

BRIEF DESCRIPTION OF THE FIGURES

FIG. 10 shows pseudocode executed on arrival of a packet.

FIG. 11 shows pseudocode executed when a packet completes transmission.

FIG. 16 shows pseudocode executed on arrival of a cell.

FIG. 17 shows pseudocode executed when a cell completes transmission.

DETAILED DESCRIPTION OF THE INVENTION

Figure 1:
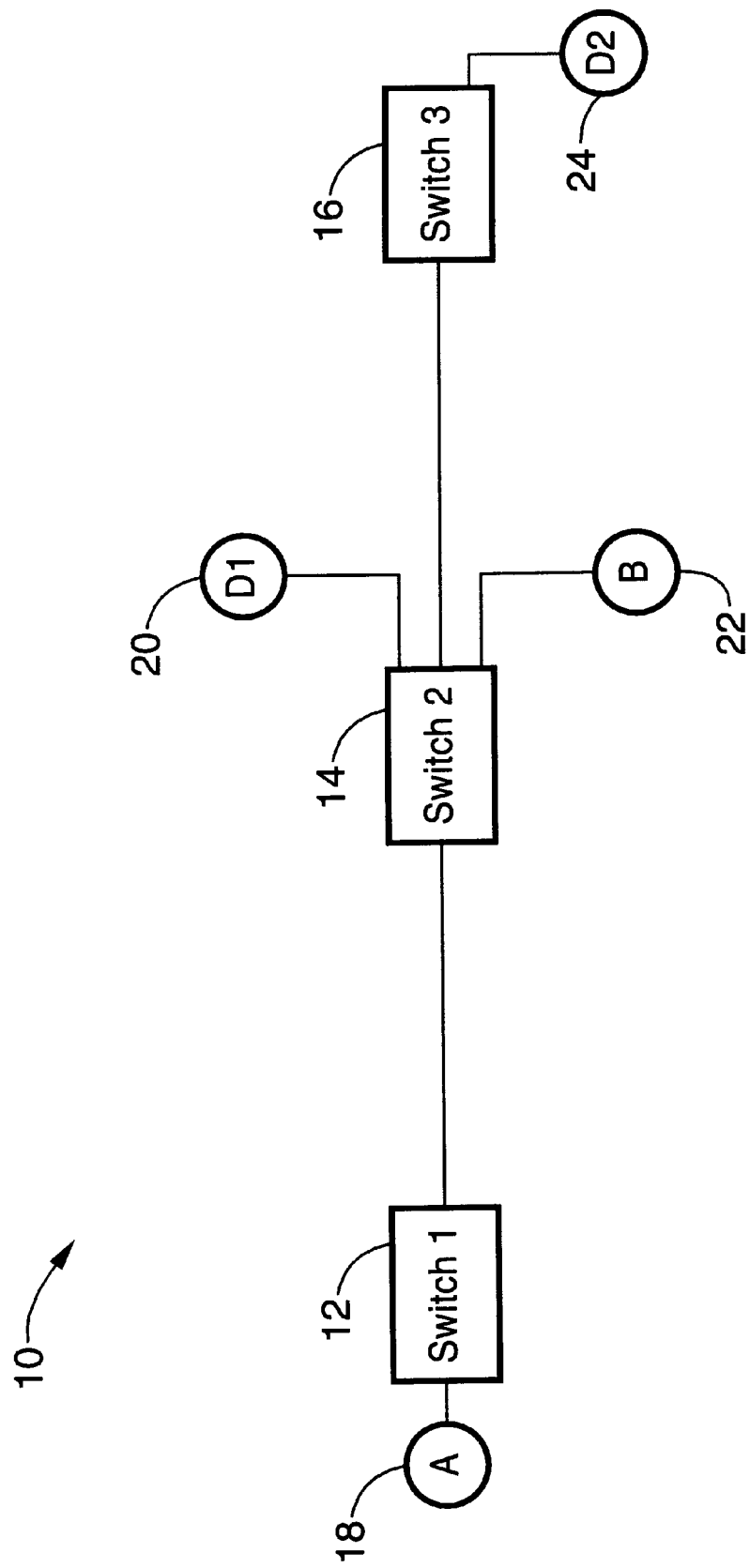
FIG. 1 is a simplified network model.

The present invention is directed to an improvement in traffic scheduling for packet switched communication networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Many future applications of packet networks will rely on the ability of the network to provide Quality-of-Service guarantees in the form of end-to-end delay, bandwidth, delay jitter (variation in delay), packet loss rate, or a combination of these parameters. The present invention teaches a traffic scheduling system and method that provides end-to-end delay bounds identical to those of Packet-level Generalized Processor Sharing (PGPS), also known as Weighted Fair Queueing, without the complexity of simulating the fluid-model system, as required by PGPS.

In addition, the present invention is fair in that the sessions are not penalized for excess bandwidth they received while other sessions were idle, in contrast to the VirtualClock method. The present invention is therefore ideally suited for implementation in packet switches supporting a large number of sessions. Implementations of the system or method of the present invention are described for general packet networks supporting variable-size packets and for Asynchronous Transfer Mode (ATM) networks supporting fixed-size packets (cells).

The present invention provides fairness among the sessions sharing an outgoing link of a switch by maintaining a variable, referred to as system potential that tracks the progress of work in the system. This variable is similar to the virtual time function in PGPS, but the calculation of system potential does not require simulation of the fluid-model system as required by PGPS. The calculation of system potential in the present invention is accomplished in a constant number of steps regardless of the number of sessions sharing the outgoing link, that is in a predetermined period of time. In contrast, the calculation of virtual-time in PGPS requires O(V) steps, where V is the number of sessions sharing the outgoing link.

Definitions and Notations

In considering the traffic scheduling system and method for packet-switched networks as described in this application, certain definitions are helpful. A "Packet" is a variable-length protocol data unit generated by any protocol. A "Cell" is a special case of a packet defined in the Asynchronous Transfer Mode (ATM) protocol standards, with a fixed length of 53 bytes (out of which 5 bytes form the header and 48 bytes payload). Unless stated otherwise, the term "packet" in the following definitions is used in a general sense to mean both variable-size packets and fixed-size ATM cells.

A "session" or "Connection" refers to an application between two nodes in a network that communicates through a specified path in the network. The "Header" of a packet or cell is a set of pre-defined fields containing identifying information about its contents. Packets or cells belonging to an application session are identified by a unique identifier, called "Connection Identifier" carried in the header of the packet or cell.

A "Flip-Flop" is a device with two stable states, denoted by 0 and 1. A "Counter" is a variable that can take one of N distinct integer values, 0 through N-1, and that can be incremented or decremented by a specified amount. A "Modulo-N" operation is an arithmetic operation in which the result is the remainder obtained by dividing the specified operand by the integer N. "Pseudocode" denotes a combination of programming language constructs and natural language used to express a computer program in simpler terms than conventional programming languages.

"System Potentiar" refers to a global variable maintained by the scheduling method that is used to track the progress of work in the scheduling system.

The theoretical basis for our scheduling method is an ideal "fluid-model system" where data transmitted by each session is considered to be infinitely divisible and multiple sources may transmit their data simultaneously through a single physical communication link, much like multiple fluid streams flowing in a pipe. This allows the allocation of bandwidth to the sessions sharing the link to be varied from instant to instant. By "ideal system," we refer to such a fluid-model scheduling system where the reserved rates of the sessions sharing the link are exactly identical to those in the actual system, and where packets arrive exactly as in the actual system. Note that such a fluid-model system is not implementable practice, but serves as a reference model in the design of our scheduling method. Thus, our scheduling method may be seen as attempting to approximate this reference system as closely as possible.

Similar to the system potential a function called "connection potential" is used to represent the state of each session in the ideal system. There is a separate connection potential function associated with each session sharing the outgoing link where the scheduling method is applied. The connection potential is meant to represent the accumulated service that a connection should have received in the ideal system. The connection potential functions are not explicitly computed or maintained in our scheduling method, but serve as a reference for tracking the state of each session in the actual system. However, the concept of connection potential is used to compute two parameters for each arriving packet in the actual system. The first one is the "starting potential" of the packet, that represents the value of the connection potential reached when the first bit of the packet starts transmission in the ideal system. The second is the "timestamp" that denotes the value of the connection potential at a time when the last bit of the packet ends transmission in the ideal system. Thus, the starting potential and timestamp may be seen as estimates of the connection potential in the ideal system at the beginning and end, respectively, of transmission of the packet. It should be noted that the actual steps involved in computing the starting potential and timestamp do not require a simulation of the ideal system. References are made to the ideal system only because it serves as the theoretical foundation on which the scheduling method is based.

The starting potential and timestamp are computed by the scheduling method for each packet on its arrival into the system. The timestamp determines the order in which packets are to be transmitted. Packets are always transmitted by the system in the order of increasing timestamp values. The timestamp is also referred to as the "Finishing Potential" of the packet. In the first preferred embodiment of this invention, intended for networks with variable packet sizes, the values of the system potential, timestamps, and starting potentials are represented as floating-point numbers.

"Priority Queue" is a data structure for storing the packets in such a way that the following operations can be performed efficiently: (i) Selection and retrieval of the packet with the minimum timestamp value, and (ii) Insertion of a packet with arbitrary timestamp value. Conceptually, the priority queue may be regarded as a queue of packets which have been sorted in increasing order of their timestamp values. In the first preferred embodiment of this invention, intended for general networks with variable packet sizes, the term "Packet Queue" refers to a priority queue of packets, maintained in increasing order of their timestamp values. In the second preferred embodiment, meant for ATM networks, a "Cell Queue" serves the same function, wherein the ATM cells are maintained in increasing order of their timestamp values.

"SP Queue" is a data structure in which one entry is maintained for each queued packet and the entries are arranged in increasing order of the starting potential values of the packets.

"Post-Transmission Procedures" refer to the steps performed when a packet completes transmission in the system. These include, but are not limited to, (i) increasing the system potential by the transmission time of the packet just transmitted, and (ii) performing a system-potential update operation if required. The system-potential update operation is a recalibration of the system potential function so as to maintain it closer to the individual connection potentials of those connections with one or more packets queued in the system.

The following definitions pertain specifically to the preferred implementation of the priority queue, meant for an ATM network. In this implementation, the timestamps are represented as integers, modulo W. Therefore, at any time, the possible timestamp values of queued cells fall in the range 0 through W-1. A distinct flip-flop is used to indicate if a cell with the corresponding timestamp value is queued in the system; that is, flip-flop j is set to 1 if a cell with timestamp value j (modulo W) is queued in the system, and 0 otherwise. The states of these flip-flops are referred to as "slots." Thus, there is an array of W slots in the system, numbered 0 through W−1. A "slot" can be in one of two states:

An "empty slot" signifies that there are no cells queued with the corresponding timestamp value, while a "full slot" indicates that one or more cells are queued with the corresponding timestamp value. These states correspond to the flip-flop states of 0 and 1, respectively. For each full slot j, a list is maintained for all the cells with timestamp value equal to j (modulo W). The first cell in this list is located by storing its address in a "Head Pointer." The Head Pointers corresponding to the W slots together form the "Head Pointer Array."

In addition to this, a second list is maintained, one per connection, of cells belonging to a particular connection in the order in which they arrived. When a new cell arrives in the system, it is added to the tail of the list corresponding to the connection to which the cell belongs. To locate the tail of this list, a "Tail Pointer" is maintained, one for each connection, that points to the most-recently arrived cell of the connection. These Tail Pointers together form the "Tail Pointer Array."

For clarity of explanation, the illustrative embodiment of the invention is presented as comprising individual functional blocks. The functions these blocks represent may be provided through the use of either shared or dedicated hardware, including, but not limited to, hardware capable of executing software. For example, the functions of processors presented in the following figures may be provided by a single shared processor or single unit of hardware. (Use of term processor should not be construed to refer exclusively to hardware capable of executing software.)

Illustrative embodiments may comprise microprocessor and/or digital signal processor hardware, read-only memory (ROM) or random-access memory (RAM) for storing software performing the operations discussed below and storing the results. Very large scale integration (VLSI) hardware embodiments, as well as custom VLSI circuits may also be used to implement the functional blocks. Field-programmable gate arrays (FPGAs), or other programmable logic devices, possibly in combination with read-only memory or random-access memory, may also be provided.

The traffic scheduling method and system 10 of the present invention is implemented within a communications network. A simplified network, which would utilize the system and method of the present invention is presented in FIG. 1. In that figure, a set of switches 12, 14, and 16 (or routers) are connected in tandem to provide a network interconnecting various host computers 18, 20, 22, and 24 depicted as either the source or the destination. A communication path from source computer 18 to destination 22 would traverse the path from an input port for switch 12, through that switch 12 to an output port, and then through a transmission line connection between switches 12 and 14 into an input port of switch 14. After going through switch 14 to one of its output ports, it would reach through a transmission line the destination computer 22.

The traffic scheduling method and system disclosed here applies to both general packets and fixed-size ATM cells. However, a special embodiment is disclosed for ATM networks which will be discussed in detail later. There are two reasons for using such a special embodiment of our method for ATM networks: First, the ATM cell has a fixed length; consequently, certain computations in our scheduling method are simplified because it is not necessary to take into account the packet length as is required while handling general variable-length packets. Second, because of the small length of the ATM cell, scheduling decisions must be performed in a short time, making a hardware implementation attractive over an implementation consisting of a processor executing software instructions. Therefore, the embodiment for ATM networks is exclusively based on hardware elements for fast execution of the method. However, it should be noted that other embodiments of our method may combine hardware and software elements in ways other than the illustrative embodiments in this disclosure.

The method and system in accordance with the present invention applies to connection-oriented communications networks. These are networks where all packets belonging to a given session set up by an application between two nodes is always performed through the same path in the network. Packets belonging to an application session are identified by a unique identifier. That is, all packets that belong to the same application and transfer information between two nodes have a unique value in a designated field of the header, identifying them as belonging to that application session. This unique identifier must be carried in the header of every packet and may be unique throughout the network; alternately, a switch on the path of the session may translate the identifier value of each packet of the session into a different one before forwarding to the next switch. In the latter case, the receiving switch and the sending switch agree upon the new value of the identifier to be used. Thus, in either case, each switch on the path is able to identify the packets belonging to a given session by examination of the identifier value.

Figure 2:
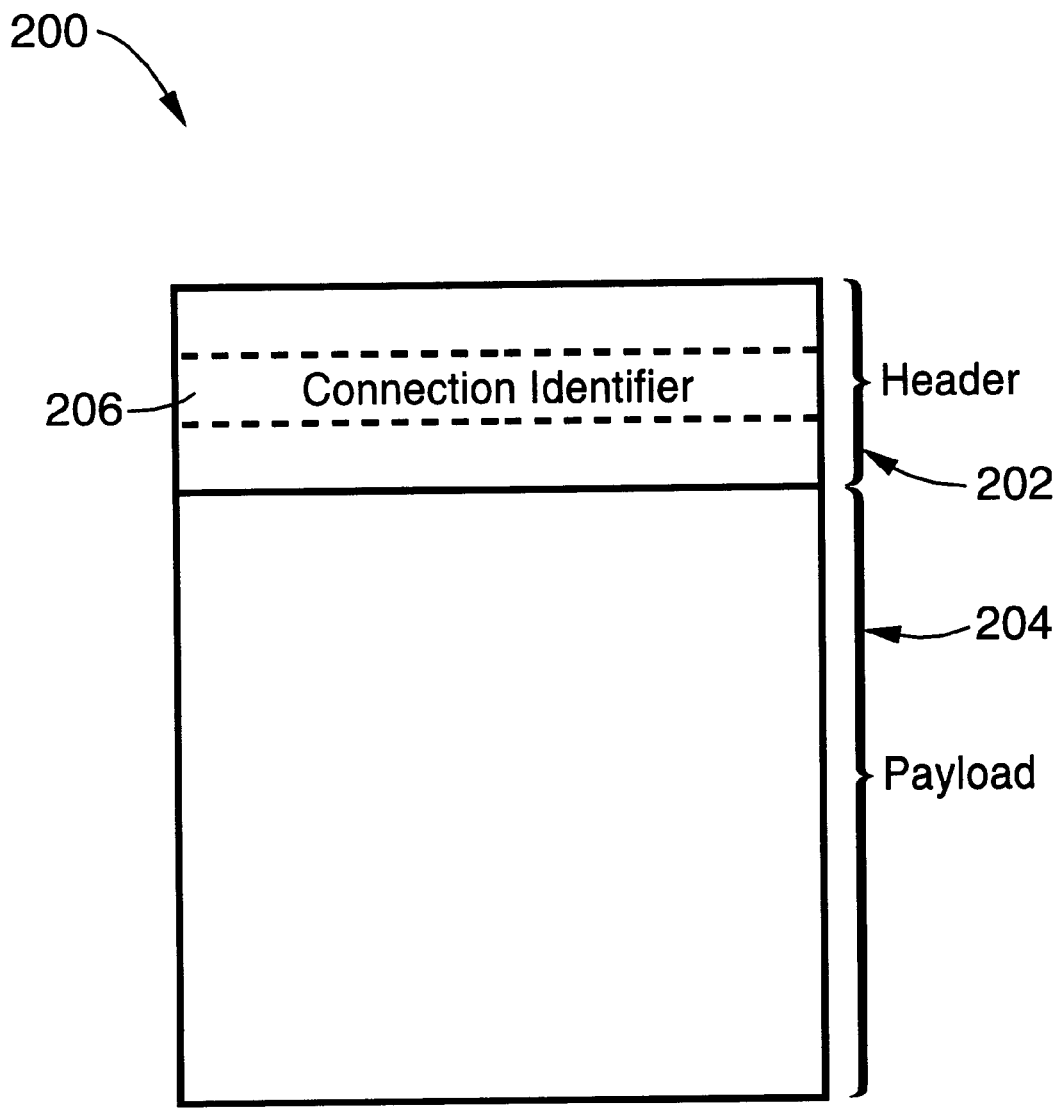
FIG. 2 is an example format of a communications data packet.

FIG. 2 is an example of a communications data packet 200. In order for the above requirement to be satisfied, a field is necessary in the packet header 202 that will determine this identifier. The data packet also includes the payload 204; what is meant by payload is the data carried in the packet. This identifier will be referred to as Connection Identifier (CI) 206. In different forms of packet networks, different fields may be used for this purpose. In an Asynchronous Transfer Mode (ATM) network, two separate fields, Virtual Path Identifier (VPI) and Virtual Channel Identifier (VCI), of the ATM cell are designated for this purpose. These two fields, either separately or together depending on context, can be used to identify the session. Similarly, in a Frame Relay network, the Data Link Connection Identifier (DLCI) field of a frame serves the same function. As a third example, the Flow ID field in the packets transmitted by Internet Protocol Version 6 also provides the same information.

Figure 3:
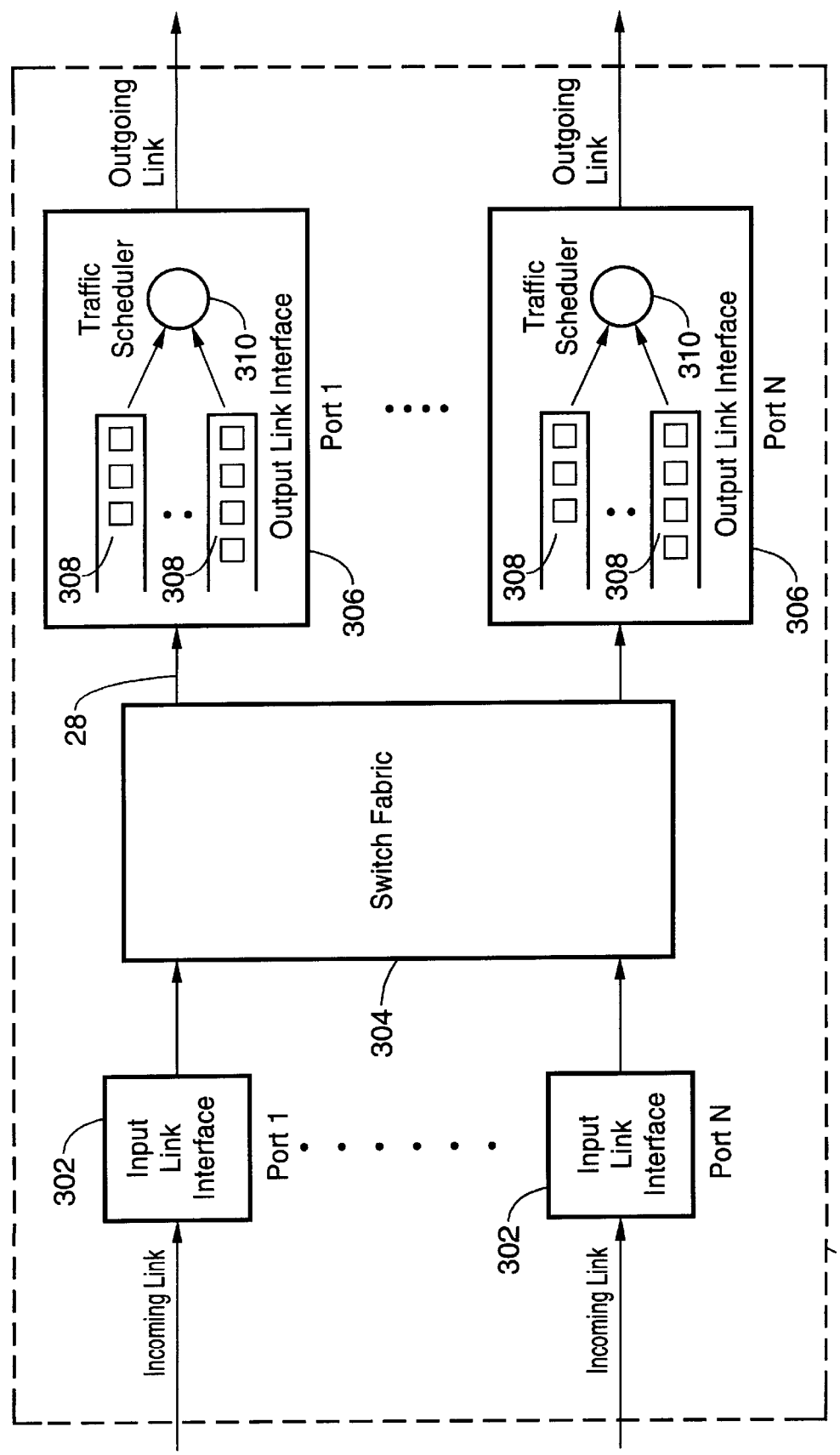
FIG. 3 is an output-buffered switch model.

In FIG. 3, a specific implementation of the traffic scheduling system in an output-buffered switch 300 is shown. What is meant by output-buffered switch 300 is a packet switch that has its buffering and traffic scheduling mechanism in the output ports. This switch comprises: i) A plurality of input ports labeled 1, 2, . . . N, interfaced to the input links by Link Interface Modules 302, ii) a switch fabric 304 is coupled to the plurality of link interface modules and iii) a plurality of output ports (illustratively also 1 to N) that are connected to the outgoing links through a set of Output Link Interface Modules 306 that are interfaced with the switch fabric 304. Each of the output link interface modules includes a plurality of packets queued for transmission 308 and a traffic scheduler 310.

As previously indicated, a separate instance of the traffic-scheduling system and method is used to control the order in which packets are transmitted in each outgoing link. Accordingly, it will be understood that each of the output link interface modules 306 will be configured to include an instance of the traffic scheduler in the same manner as depicted in FIG. 3 for the output link interface module 306 associated with Port 1 and will carry out the same buffering and processing functions described above for that illustrative output link interface module. When a packet arrives at an output link interface module 306, a timestamp is computed. This timestamp computation is aided by a variable maintained by the algorithm, called the system potential. The present invention also teaches how the system potential is calculated. After the timestamp is computed, the packet is inserted into a priority queue; packets are transmitted from the queue in increasing order of their timestamps.

Variations of the algorithm may split implementation of the traffic-scheduling system and method in different parts of the switch. For example, in an implementation the timestamp calculation method may be performed in the input link interface modules. Information concerning the potential value associated with each outgoing link is provided through a communication path between the output link interface modules and the input link interface modules. Operations concerning the timestamp calculation or the operation for updating the system potential may be performed by different processors or one central processor.

The traffic scheduling method and system of the present invention will also be applicable to multicast connections—i.e., a common source transmitting the same information to multiple destinations. Referring again to FIG. 1, consider as an example the multicast transmission from source computer 18 to the destination computers 20 and 24. Packets from the Switch 14 are transmitted to both output links 1 and 2. A specific portion of the link bandwidth is reserved for that connection in both links. Two separate instances of the traffic scheduling method are used to determine the order of transmission of packets in the output links 1 and 2, regardless of whether they come from a multicast or a unicast source.

Figure 4:
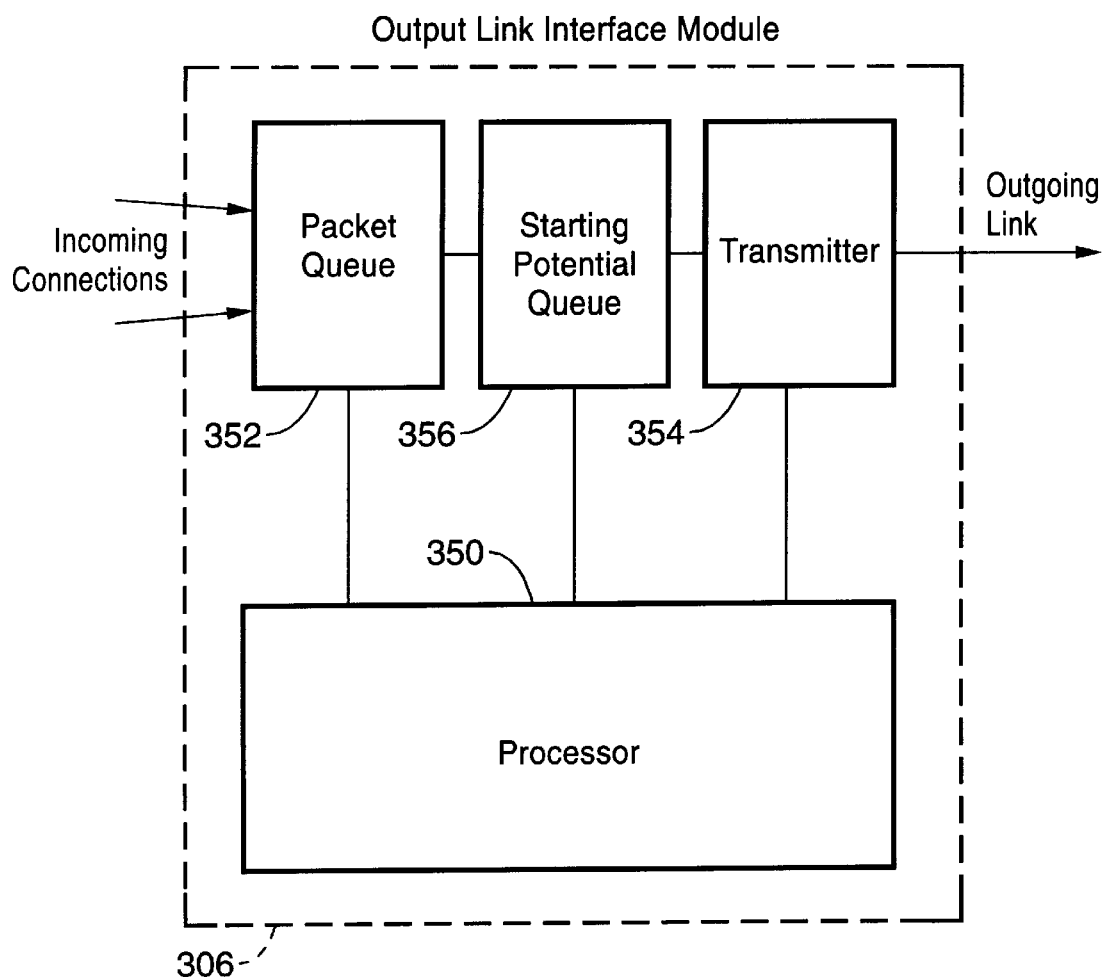
FIG. 4 is a simplified block diagram of the scheduling system.

FIG. 4 is a block diagram of the embodiment of an output link interface module 306. The output link interface module 306 will include processor 350 which controls Packet Queue 352 and Starting Potential (SP) Queue 356, and transmitter 354, the functions of which will be described later.

After the network environment has been established under which the traffic scheduling method is used the present invention will be described in detail below.

Illustrative Embodiment for General Packet Networks with Variable Packet Lengths The traffic scheduling method and system will be described in the context of general packet networks where packets may be of arbitrary length. Thereafter an embodiment tailored for ATM networks will be described in detail.

When a connection is set up in the network, a bandwidth of $\rho_i$ is reserved for each session i in each link on the path of the session in the network. The traffic scheduling algorithm must guarantee that, when the source is transmitting with a rate at least equal to $\rho_i$, bandwidth of at least $\rho_i$ is allocated to that connection. Practical systems may require $\rho_i$ to be specified as a multiple of some basic rate, such as 64,000 bits/second.

A key portion of the present invention is the method of maintaining the system potential function. The system potential function is reset to zero when the system is idle (no packets to send on the corresponding outgoing link) and increases with passage of time thereafter when the system becomes busy. The manner in which the potential function is increased is described further below. Without loss of generality, it can be assumed that the time to transmit one bit on the outgoing link is 1 unit of time. Therefore, all variables that represent time in the following description of the scheduling system are assumed to be maintained in terms of this basic unit. Those skilled in the art can easily modify the description for other units of time, such as the cycle time of a clock from which all system timings are derived.

Thus, the time to transmit a packet of length L bits is also L. It is assumed that each session i sharing the outgoing link reserves a bandwidth of $\rho_i$ bits per unit of time; equivalently, if r is the bandwidth of the outgoing link, session i reserves a fraction $r_i$, where $$r_1 = \rho_i / r$$

However, it should be noted that, since only whole packets can be transmitted on the outgoing link, and since the lengths of two packets need not be identical, the bandwidth guarantee is meant to hold only over a period much longer than the transmission time of a single packet.

It is assumed that the system potential is represented as a floating-point number. On the completion of transmission of each packet, the system potential is increased by the transmission time of that packet. In addition, the system potential is updated at the end of transmission of each packet by a system-potential update operation. The system-potential update operation updates the system potential so that the system potential is not lower than the minimum among the starting potentials of all the packets presently queued in the system, as described in detail later.

Figure 5:
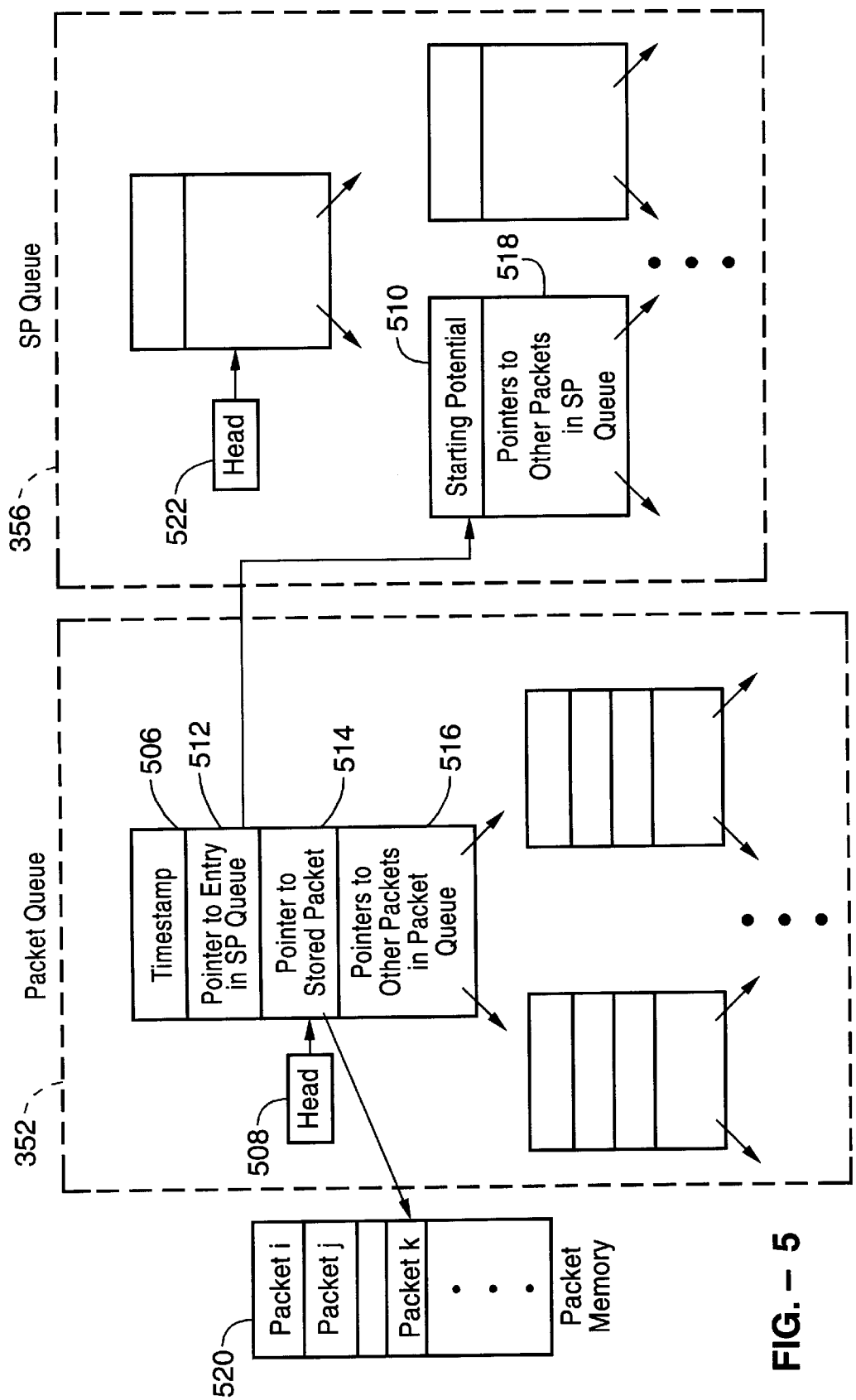
FIG. 5 shows fields associated with entries in the Cell Queue and SP Queue.

Referring now to FIG. 5, the scheduling system in accordance with the present invention employs two key data structures: a packet queue 352 and starting potential (SP) queue 356. The packet queue 352 determines the priority queue of packets waiting to be transmitted on the outgoing link. Packets in this queue are ordered according to their timestamp values 506 so that, at any time, the packet with the minimum timestamp value appears at the head of the queue 352. Upon arrival of a packet, the timestamp value 506 is computed and is used to determine its position in the packet queue 352.

The SP queue 356 is a priority queue of entries, one entry corresponding to each packet in the system. In addition to the timestamp, a starting potential value 510 is computed for each packet upon its arrival. Entries in the SP queue 356 are arranged in order of their starting potential values so that the entry with the lowest starting potential appears at the top. Each entry in the SP queue 356 stores, in addition to the starting potential value 510 of the corresponding packet, the necessary pointers 518 to other entries so as to implement the SP queue 356.

Since it is necessary to remove the corresponding entry from the SP Queue 356 when a packet is selected for transmission, a pointer 512 to the entry in the SP Queue 356 is stored along with each packet in the Packet Queue. It is assumed that both the timestamp and the starting potential values are represented as floating-point numbers and have the same format as that of the system-potential representation. The Packet Queue 352 and the SP Queue 356 are maintained in random-access memory by the use of an appropriate data structure, such as a heap.

FIG. 5 illustrates the fields associate with each entry in the Packet Queue 352 and the SP Queue 356. Each entry in the Packet Queue stores the timestamp value 506 of the packet, a pointer 514 to the location in packet memory 520 where the packet is buffered, a pointer 512 to the corresponding entry in the SP Queue 356, and possibly, links 516 to other entries in the Packet Queue 352 to implement the priority queue structure. An entry in the SP Queue 356 contains only the starting potential value of the packet and possibly, links 518 to other entries in the SP Queue 356.

A head pointer 508 points to the entry at the head of the Packet Queue 352, which corresponds to the packet with the smallest timestamp value currently in the system. Similarly, a head pointer 520 points to the entry at the head of the SP Queue, which corresponds to the packet with the smallest starting potential in the system.

The traffic scheduling method consists of three functional parts.

1. The method and system that determine how the system potential value is calculated for each outgoing link, as outlined above.
2. The method and system that determine how the timestamps are calculated using the value of the system potential.
3. The method and system to buffer the packets and select the packet with minimum timestamp for transmission.

These functional parts are embodied in the following description of the scheduling system. The processing performed in the system can be divided into two distinct methods which operate in parallel to each other. By parallel, it is meant that the two methods operate independently and, at times, simultaneously with each other. There are variables that are shared by the two methods, but the procedures that occur within each method operate independent from each other. These two methods can be explained by referring again to block diagram of the output link interface module 306 in FIG. 4.

The first method in FIG. 4 includes those steps that are executed when a data packet is received at the output link interface module 306 from the switch fabric 304 (FIG. 3). The principal operation performed in this method is the computation of a starting potential and timestamp for each arriving packet. The starting potential is meant to estimate the value of the connection potential function associated with the session that transmitted the packet in the ideal system, at the instant at which the packet starts transmission. Similarly, the timestamp is meant to estimate the value of the connection potential function associated with the session in the ideal system, at the instant at which the packet finishes transmission.

The current value of the system potential is used in this computation of the timestamp. After the timestamp is computed, the packet is inserted into the Packet Queue 352 in FIG. 4; packets are stored in the Packet Queue 352 in increasing order of their timestamps, so that the packet with the smallest timestamp value appears at the head of the queue. An entry for the arriving packet is also inserted into the SP Queue 356, ordered according to the starting potential value.

The second method in FIG. 4 comprises the steps that are executed each time a data packet completes its transmission in the transmitter 354. These include the steps in selecting the next packet for transmission, transmitting the packet by sending it to the transmitter 354, and updating the system potential. Selection of the next data packet is accomplished by choosing the packet that currently appears at the head of the Packet Queue 352, whose timestamp is the minimum among all the packets queued for transmission on the outgoing link.

Implementation of either of the two methods may be in hardware or software, or a combination of both. Although both methods are shown illustratively as being performed by the processor 350 in FIG. 4, the methods may be executed by a variety of other means such as state machines implemented in hardware. Several factors, such as the transmission speed of the outgoing link and the size of the data packets, will determine the type of implementation.

Figure 6:
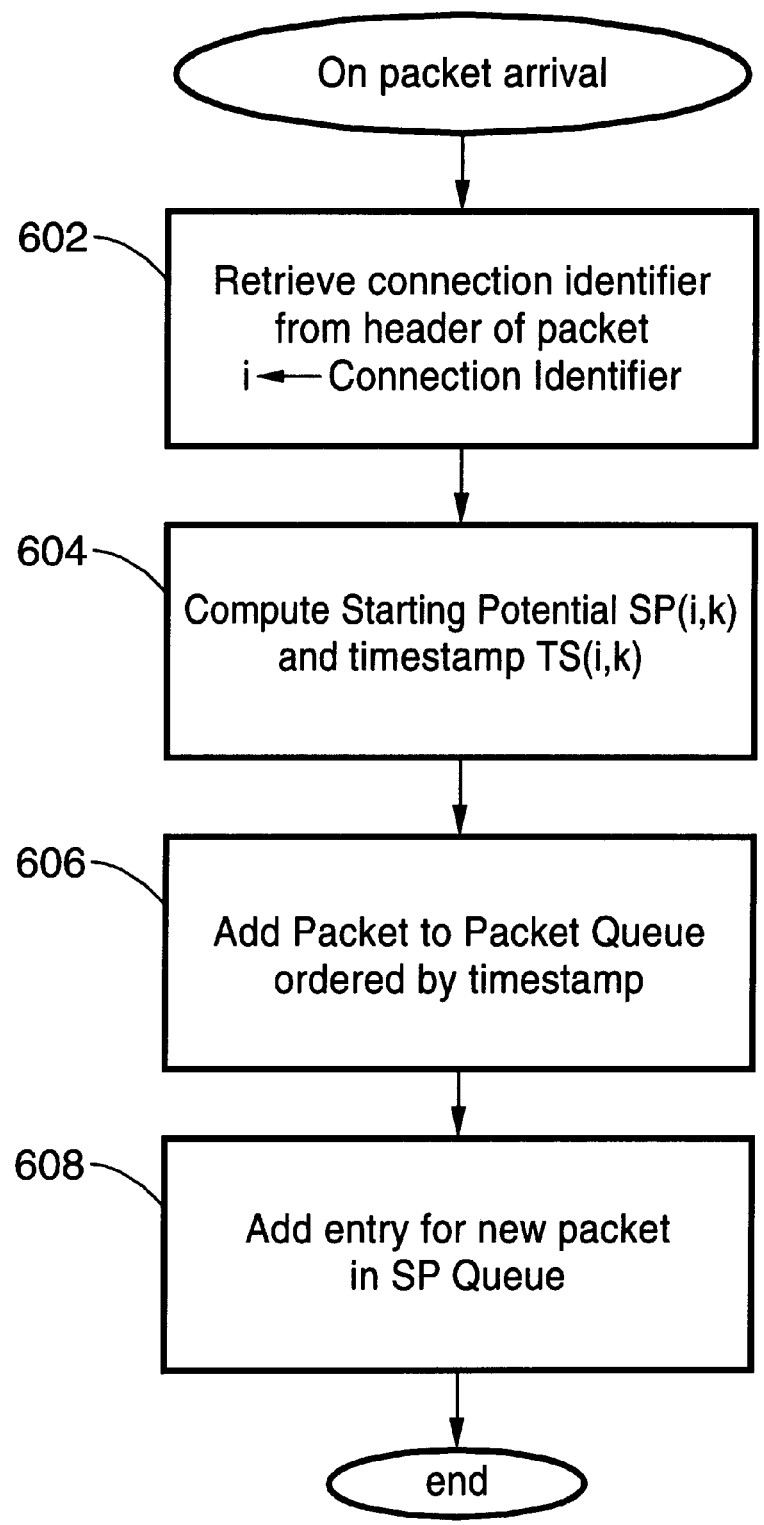
FIG. 6 is a flowchart of processing steps performed when a new packet arrives at the Output Link Interface Module.
Figure 8:
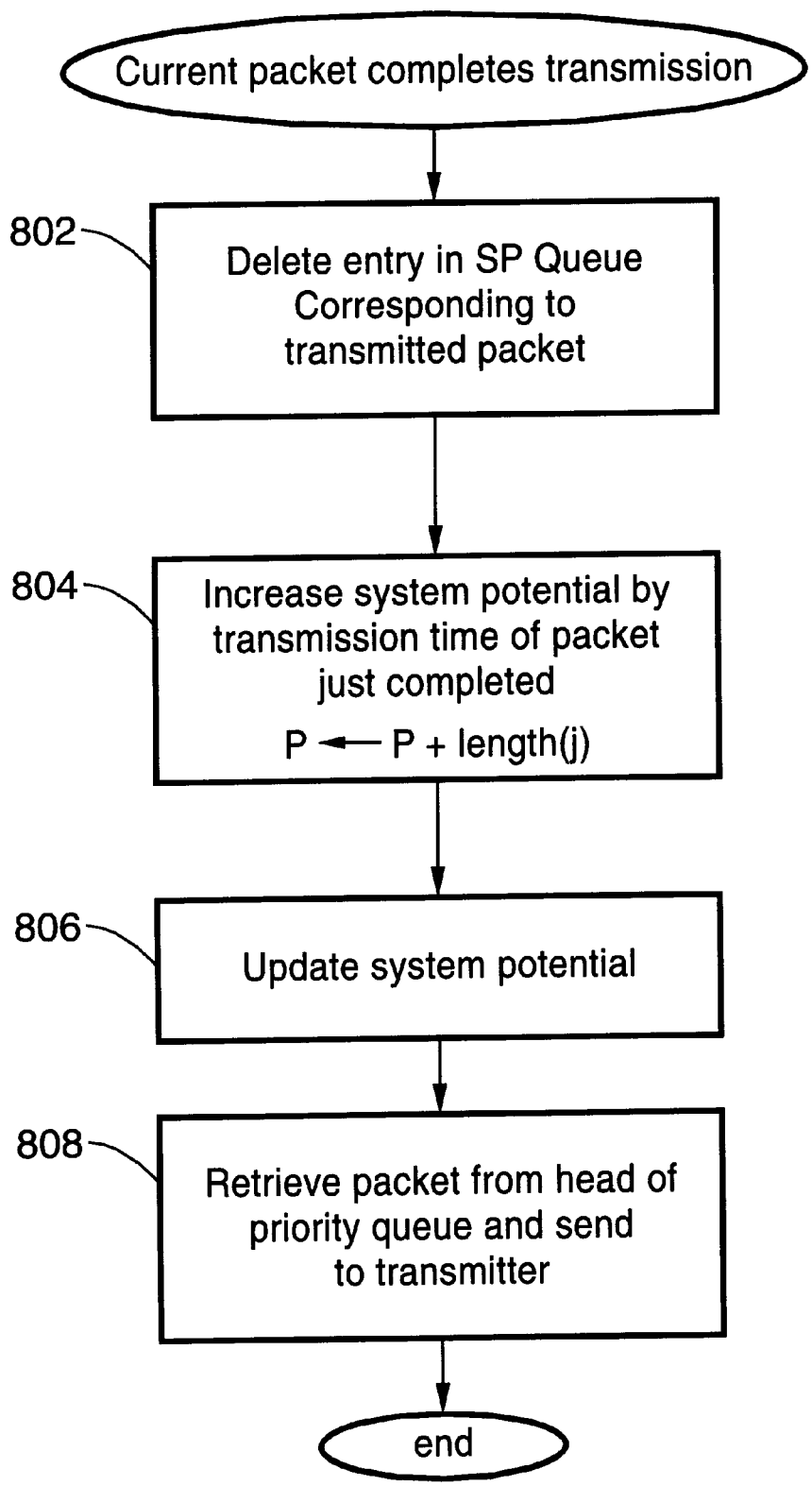
FIG. 8 is a flowchart of processing steps performed when a packet completes transmission.

The steps executed in the two methods outlined above are elaborated in the flowcharts of FIGS. 6 and 8, respectively. FIG. 6 is a flowchart of processing steps performed when a new packet arrives at the output link interface module. The steps in the flowchart of FIG. 6 are executed when a new packet arrives at the output link interface module. First, the Connection Identifier is retrieved from the header of the packet to identify the session that the packet belongs to, say i via step 602. Next the starting potential and timestamp of the packet are computed via step 604, explained later in detail. The packet is inserted into the Packet Queue 352 according to its computed timestamp such that packets in the queue appear in the order of increasing timestamp values via step 606. Finally, an entry corresponding to the new packet is added into the SP Queue 356 via step 608.

Figure 7:
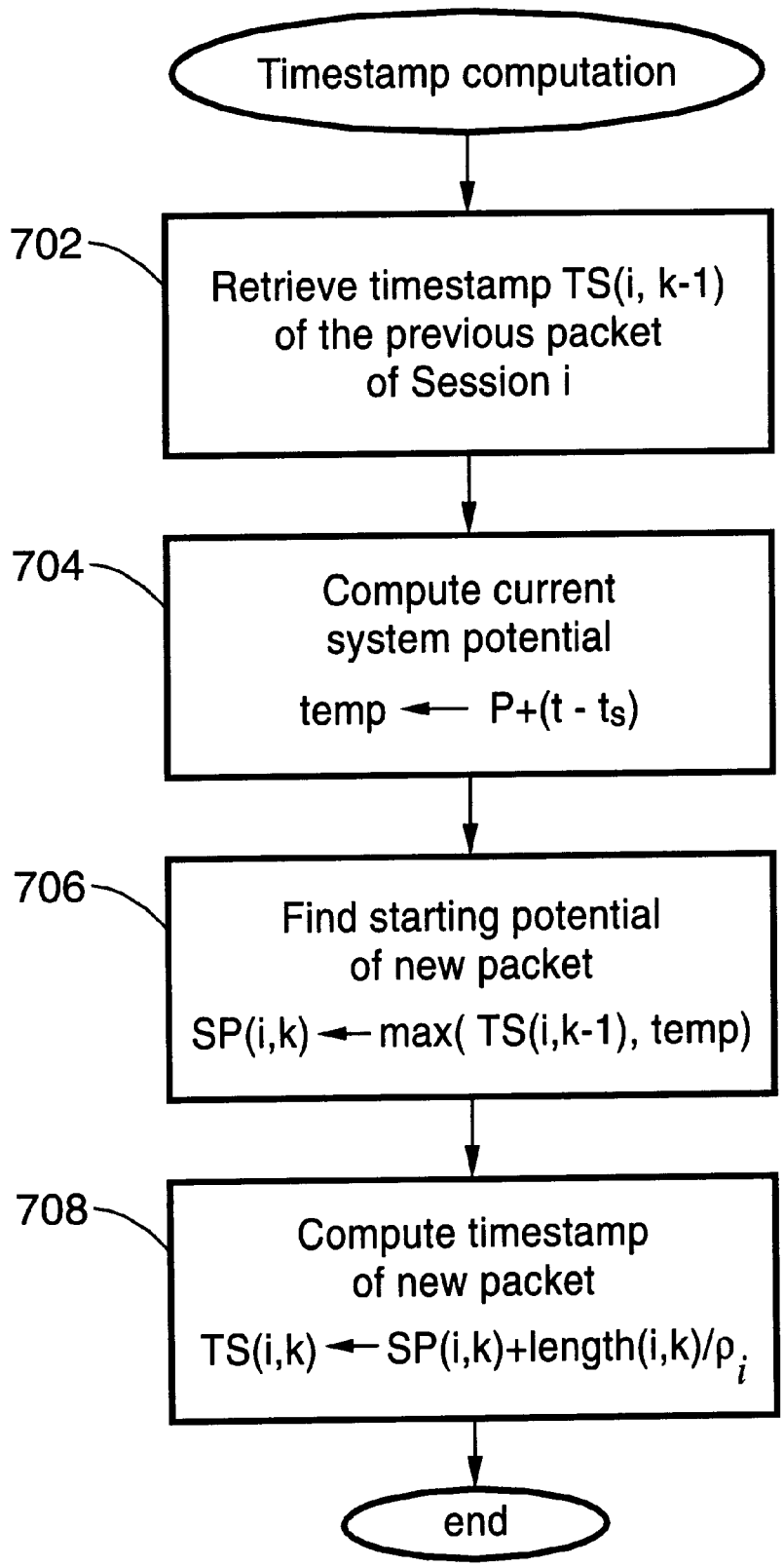
FIG. 7 is a flowchart of processing steps for computation of starting potential and timestamp of a packet upon its arrival.

The processing steps embodied in step 604 of the flowchart of FIG. 6 are elaborated in the flowchart of FIG. 7. As has been before mentioned, the starting potential of the packet is intended to estimate the value of the connection potential function in the ideal system associated with the session that transmitted the packet, at the instant when the packet starts service (transmission). Similarly, the timestamp of the packet is intended to estimate the value of the connection potential function at the instant when the packet finishes service, assuming its service rate on the outgoing link is the reserved rate $\rho_i$. However, it should be noted that this is only an estimate, and the actual value of connection potential reached in the ideal system upon completion of the packet may be different because of several reasons:

First, packets are transmitted as integral units one after the other on the link. Second, the session i that the packet belongs to may receive a higher service rate than $\rho_i$ when one or more of the other sessions that reserved bandwidth on the link are temporarily idle. Finally, the system potential function maintained by the method is only an approximation of its actual value.

The steps involved in the calculation of the timestamp of the packet are outlined in the flowchart of FIG. 7. The first step in the flowchart is to retrieve the timestamp of the previous packet arrived from the same session via step 702, designated by TS(i,k−1), where TS stands for timestamp, i represents the session, and k−1 indicates the previous packet. To facilitate this, the timestamp of the most recently arrived packet from each session is maintained in the system. When a timestamp is computed for a newly arrived packet, its value becomes the current value of TS(i,k−1). When a connection is first set up, the value of TS(i,k−1) is taken as zero for computing the timestamp of the first packet. Similarly, when the system becomes idle, all the stored timestamp values TS(i,k−1) are reset to zero.

Next, the current system potential is computed via step 704. The variable P maintains the system potential. Since P is updated only on completion of the transmission of every packet, and the arrival of the new packet may not coincide with the completion of transmission of another packet, the system potential at the time of arrival of the new packet is calculated in the variable temp by adding to P the elapsed real time since the current packet in transmission started its service. That is, $$\text{temp}=P+(t-t_s)$$

where t is the current time and $t_s$ is the time at which the packet currently being transmitted started its service. This value of the system potential is then used in the computations of the starting potential and timestamp as described in the following paragraphs.

Next, the starting potential of the packet is computed via step 706. The starting potential is an estimate of the value of the connection potential function in the ideal system, associated with the session that transmitted the packet, reached at the instant when the packet starts transmission in the ideal system. The timestamp of the packet is then computed from the starting potential via step 708. This starting potential represented by the variable SP(i,k), is calculated as the maximum of two values: (i) the timestamp of the previous packet arrived for session i designated as TS(i,k−1), and (ii) the system potential computed in step 704. The timestamp of the new packet, denoted as TS(i,k), is then computed in step 708 as $$TS(i,k)=SP(i,k)+\text{length}(i,k)/\rho_i$$

where length(i,k) is the length of the new packet and $\rho_i$ is the reserved bandwidth of session i. Thus, TS(i,k) represents the value of the connection potential associated with session i in the ideal system, reached when the current packet completes transmission, assuming the connection potential when the packet starts transmission is SP(i,k) and the session is serviced at the rate $\rho_i$ during transmission of the packet.

The second functional part of the traffic scheduling system is the processing that is performed when the current packet being transmitted completes its transmission. The steps that are performed in this part are outlined in the flowchart of FIG. 8. First, the entry corresponding to the packet just transmitted is deleted from the SP Queue via step 802. The system potential is P then increased by the transmission time of the packet that just completed its transmission via step 804. This is accomplished by the update equation $$P \leftarrow P+\text{length}\,(j)$$

where length(j) is the length of the packet (in bits) that just completed transmission. It should be noted here that the time to transmit length(j) bits of the packet is also length(j) units, since our basic unit of time is the transmission time of one bit.

Next, a system-potential update operation is performed via step 806. This operation updates the system potential so that the system potential is not lower than the minimum of the starting potentials of all the packets currently queued in the system. This operation involves a number of constituent steps, which are further outlined in the flowchart of FIG. 9. Finally, the packet at the head of the Packet Queue is retrieved and sent to the transmitter via step 808. Since the Packet Queue is maintained in order of the timestamps, the packet that is selected is always the one whose timestamp value is the minimum among all packets queued for the outgoing link.

Referring to the flowchart of FIG. 9, the system-potential update operation, step 806 of FIG. 8, is performed as follows: The starting potential value $SP_{min}$ corresponding to the entry at the head of the SP Queue is first retrieved via step 902. Next, a determination is made as to whether the system potential value is less than this starting potential value $SP_{min}$ via step 904. If the system potential P is less than this value, then the system potential is updated to $SP_{min}$ via step 906. Note that the entry at the head of the SP Queue remains unmodified after this step. An entry is removed from SP Queue only when the corresponding packet is transmitted.

In the above description, it is assumed that an entry is maintained in the SP Queue for every packet in the system. In actual implementation, however, it is sufficient to maintain one entry for each active session, which corresponds to the first packet in the queue of the session. When a packet completes transmission, the entry corresponding to the session is deleted from the queue and a new entry for the session, prioritized by the starting potential of the next packet of that session, is added to the SP Queue.

The operations in the flowcharts of FIGS. 6 and 8 are presented in pseudocode format in FIGS. 10 and 11, respectively.

Figure 9:
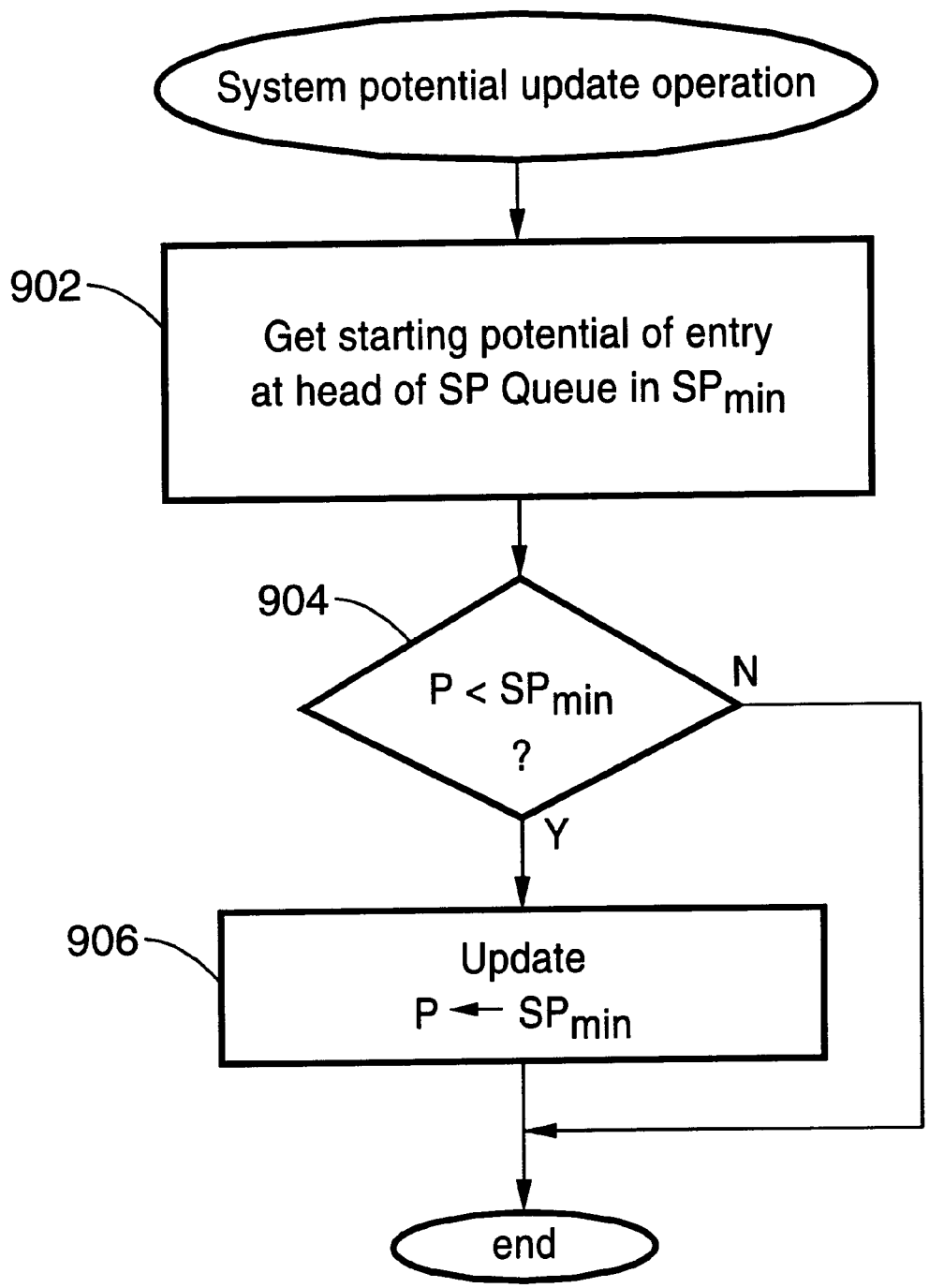
FIG. 9 is a flowchart of processing steps in the system-potential update operation.

The system-potential update operation as shown in the flowchart of FIG. 9 is required to achieve fairness and low end-to-end delays for the application sessions whose packets are being scheduled by the traffic scheduling method.

An example is now presented to illustrate the operation of the system in accordance with the present invention. Consider the scheduling system of FIG. 12, where three connections 1202, 1204, 1206 share an outgoing link 1208 of a switch whose total bandwidth capacity is 1 unit. Assume, for the sake of illustration, that each of the connections 1202, 1204 and 1206 have respectively reserved 50%, 25%, and 25% of the bandwidth of the outgoing link. Assume further that the system was idle at time t=0, so that the system potential is zero at time 0.

Now consider the following sequence of events: At time 0, a total of 6 packets 1210a–1210f arrive in the queue of connection 1, and a total of 4 packets 1212a–1212d arrive in the queue of connection 1204. Let each of these packets be of the same length, equal to one unit. Also assume that connection 1206 remains idle, so that its queue remains empty.

Let us consider the sequence of events in the scheduling system. Proceeding through the flowchart of FIG. 7, a timestamp is computed for each arriving packet. The timestamp of the first arriving packet of connection 1202 is computed as $$TS(1, 1) = 0 + \frac{1}{50\%} = 2$$

Similarly, the timestamps of the following packets of Connection 1202 will be computed as 2, 4, 6, 8, 10, and 12, in that order.

The timestamp of the first arriving packet of Connection 1204 is computed as $$TS(2, 1) = 0 + \frac{1}{25\%} = 4$$

Similarly, the following packets of connection 1204 are assigned timestamp values of 8, 12, and 16, respectively.

Figure 12:
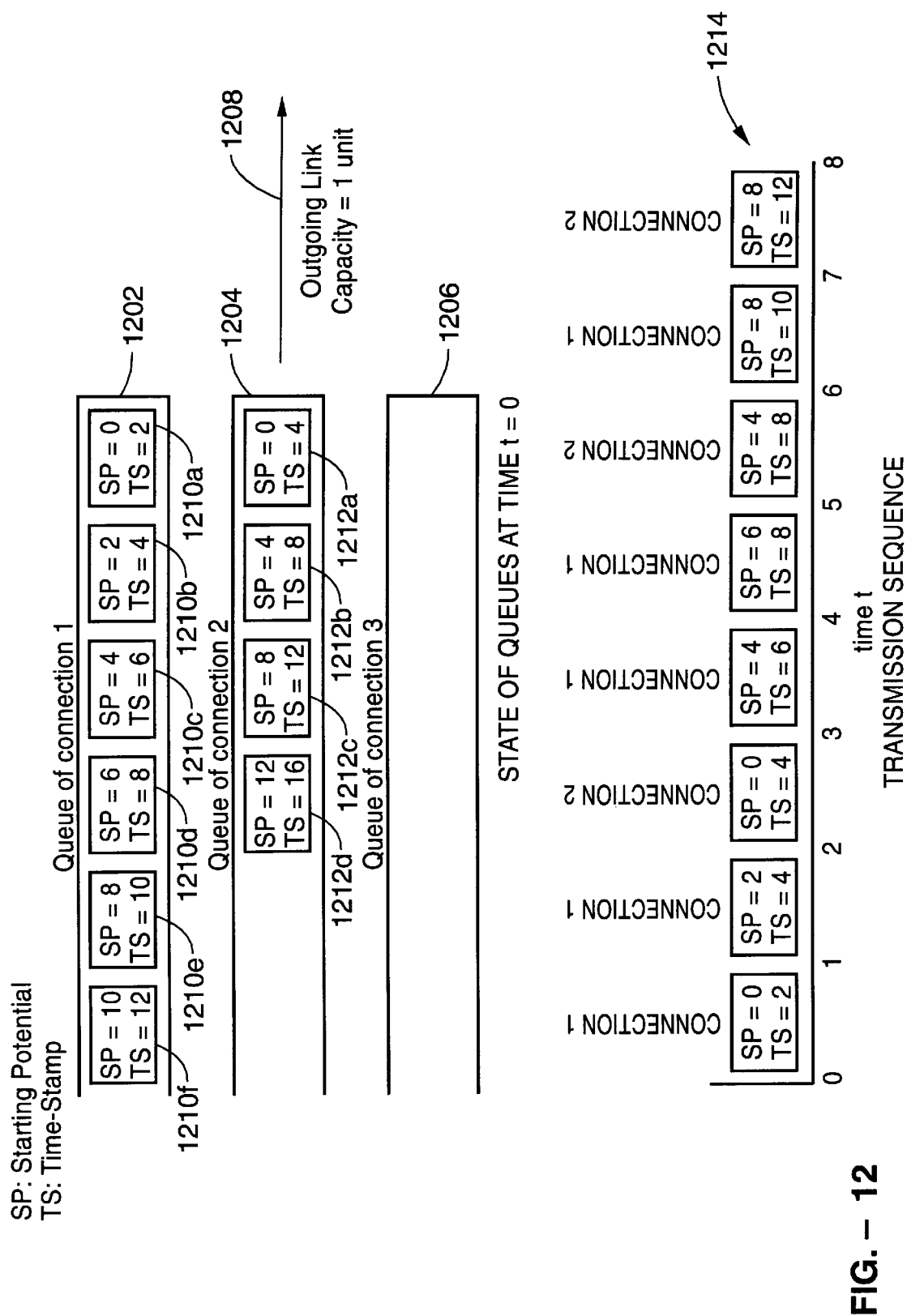
FIG. 12 is an example of a transmission sequence of packets in the scheduling system.

The packets of connections 1202 and 1204 are then inserted into the Packet Queue in the order of their timestamps and are transmitted in that order. FIG. 12 also shows the order in which the above packets are transmitted by the scheduling system. Note that, since connection 1206 is idle, connection 1202 effectively receives a bandwidth allocation of 0.5/(0.5+0.25)=66.67% of the link capacity and Connection 1204 receives the remaining 33.33%.

Since each packet is of length 1 unit, the system potential will be increased by 1 unit at the end of transmission of each packet. Thus, at time t=8, the system would have completed transmission of a total of eight packets (five from connection 1202 and three from connection 1204), as shown in FIG. 12. Thus, without the system-potential update operation, the value of the system potential at this time would also be equal to 8. If a packet from connection 1206 were to arrive in its queue at this time, its timestamp would be computed, based on the system potential of 8, as $$TS(3, 1) = 8 + \frac{1}{25\%} = 12$$

Note that this causes the packet of connection 1206 to be transmitted immediately. This effect causes connection 1206 to receive more service in the short term as compared to connections 1202 and 1204. The system potential update operation is designed to correct this unfairness.

However, with our scheduling method, the system potential is updated at the end of transmission of each packet to the smallest starting potential of packets remaining in the queue, as per the flowchart of FIG. 9. Thus, in the above example, when the system completes transmission of the first 8 packets, the smallest timestamp value of packets remaining in the queue is now 12, and the smallest starting potential is 10. Thus, the system-potential update operation would now update the system potential so that it is equal to the smallest starting potential, that is 10. The corresponding value of the timestamp of the newly arrived packet of connection 1206 will be $$10 + \frac{1}{25\%} = 14$$

Thus, the system-potential update operation can be seen to correct the unfairness that would otherwise occur in a packet scheduling system.

Illustrative Embodiment for ATM Networks

Although the embodiment described above for general packet networks can be also used in the context of ATM networks, in this section a simplified version is presented that will allow implementation entirely using hardware elements. In ATM networks the available time for completing a scheduling decision is very short. At SONET OC-3 speeds the transmission time of a cell is less than 2.7 μs. For higher speeds the available time is even less; This forces a hardware implementation. Therefore, the scheduling algorithm must be implementable without floating-point operations that may require complex hardware and/or large delays.

Since the ATM cell has a fixed size, the unit of time is now chosen as 1/K times the transmission time of an ATM cell through the outgoing link, where K is a suitable integer scaling constant. Bandwidth reservations of sessions are assumed to be in terms of number of ATM cells per unit of time. That is, each session i reserves a bandwidth equal to $\rho_i$ cells per unit of time. The fraction of the link bandwidth reserved for session i is then $\rho_i$, where $\rho_i$ is given by $$\tau_i = \rho_i / r$$

where r is the bandwidth of the outgoing link, also expressed in terms of units of cells per unit of time. In the previous embodiment for general packet networks, the values of system potential, timestamps, and starting potentials were represented as floating-point numbers. In this embodiment for ATM networks, however, these values are represented as integers so that floating-point computations can be avoided. These integer representations are achieved by imposing the restriction that the values of $K/\rho_i$ for each session i is an integer. The choice of the scaling constant is based on the granularity required in the bandwidth reservations of the individual sessions. This is better illustrated with an example.

Consider three sessions sharing an outgoing link of capacity 200 cells/second. Let the desired reservations of the individual sessions be 100, 30, and 70 cells/second, respectively. When expressed in units of cell transmission times, $1/\rho_1 = 200/100 = 2$ units, $1/\rho_2 = 200/30 = 6.67$ units, and $1/\rho_3 = 200/70 = 2.86$ units.

Thus, if K is chosen as 1, the values of $1/\rho_1$, $1/\rho_2$, and $1/\rho_3$ as 2, 7, and 3, are chosen, respectively. This results in actual reservations of 100, 28.57, and 66.67 cells/second, respectively, for the three sessions. A closer granularity of allocation can be obtained by choosing a larger value of K For example, for K=10

$K/\rho_1 = 2000/100 = 20$ units, $K/\rho_2 = 2000/30 = 66.67$ units, and $K/\rho_3 = 28.57$ units.

Choosing the nearest integers 20, 67, and 29, respectively, results in bandwidth allocations of 100, 29.85, and 68.97 cells/second for the three sessions, which are closer to the desired values of 100, 30, and 70, respectively.

Thus, choosing a large value of K increases the granularity with which reservations can be made. However, increasing K also increases the hardware complexity of the implementation, so a tradeoff must be made between the two.

The system potential function in this embodiment is maintained as an integer (in contrast to the floating-point representation employed in the previous embodiment). The system potential P is now maintained by increasing it by the quantity K after the transmission of every ATM cell. In addition, a system-potential update operation, similar to that described in the previous embodiment, is used to update the system potential to the minimum among the starting potentials of ATM cells queued in the system. As before, the system potential is reset to zero when the system is idle and is increased monotonically thereafter as detailed below.

As in the case of the embodiment for general packet networks, the system maintains two priority queues: The priority queue of ATM cells, maintained in order of their timestamp values, will be referred to as the Cell Queue. In addition, a priority queue of starting potentials of the cells is maintained as before, referred to as the SP Queue.

As before, the processing performed by the scheduling system in an ATM switch can be divided into two parts: (i) a part that is performed when a new cell arrives at the output link interface module 306 connected to the outgoing link where the cell is destined to, and (ii) a part that is executed when the transmission of a cell has been completed. These two parts are described separately in the following paragraphs.

Figure 13:
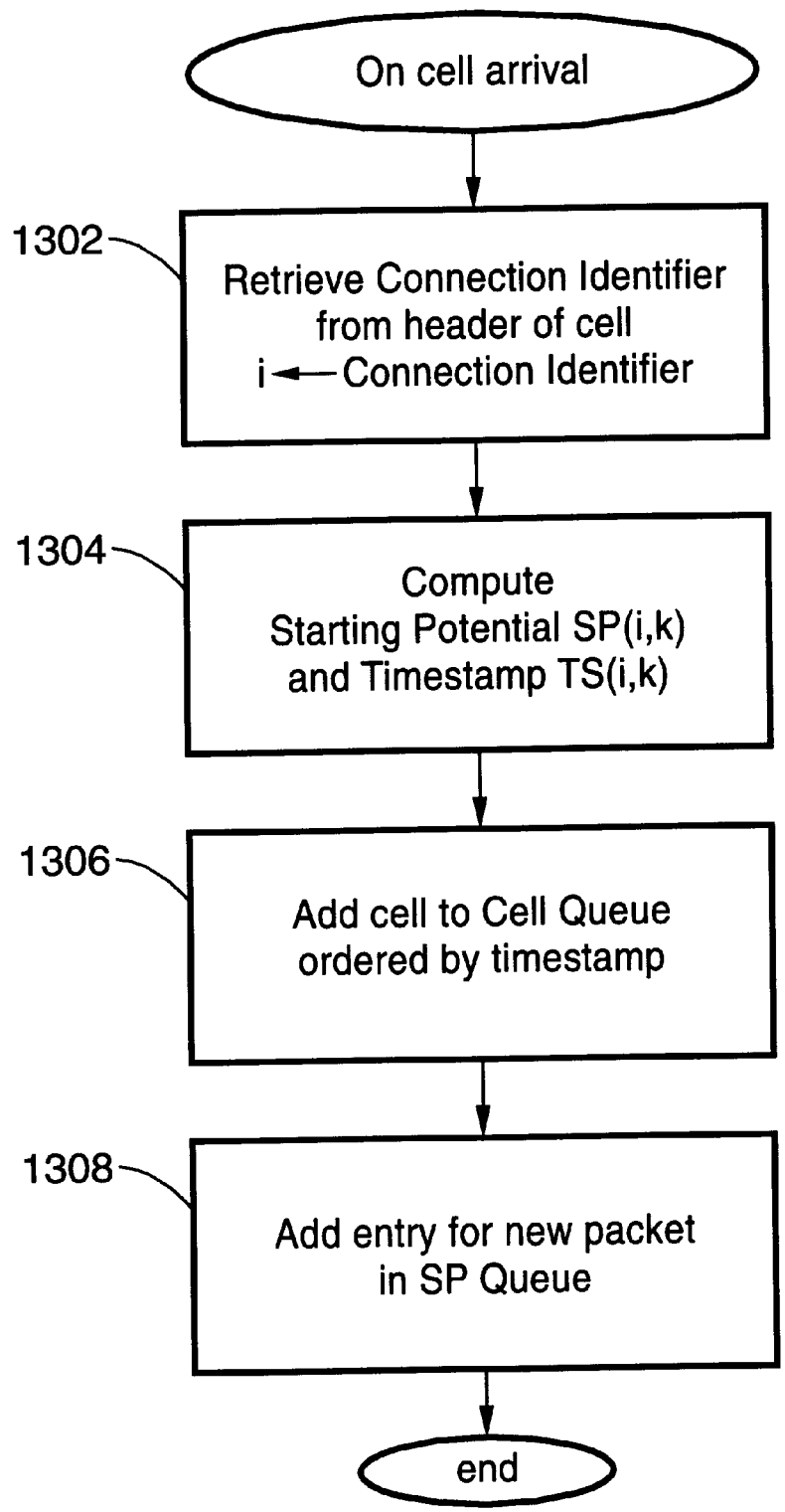
FIG. 13 is a flowchart of processing steps performed when a new cell arrives at the Output Link Interface Module in the ATM switch.

The steps in the flowchart of FIG. 13 are executed when a new cell arrives at the output link interface module. Since the transmission time of an ATM cell is very short, in this case it can be assumed that incoming cells are processed only at the boundaries of cell transmissions, so that calculation of the system potential need not take into account the partial service received by the cell currently being transmitted. First, the Connection Identifier is retrieved from the header of the cell to identify the session that the packet belongs to, via step 1302. The Connection Identifier in this case is obtained from the values in the Virtual Channel Identifier (VCI) and/or Virtual Path Identifier (VPI) fields of the header of the ATM cell. Next the starting potential and timestamp for the cell are computed, via step 1304. This is further elaborated in the flowchart of FIG. 14. After the timestamp has been computed, the cell is added into the Cell Queue according to its computed timestamp such that cells in the queue will be transmitted in the order of increasing timestamp values, via step 1306. Finally, an entry with the starting potential of the new cell is added to the SP Queue, via step 1308.

Figure 14:
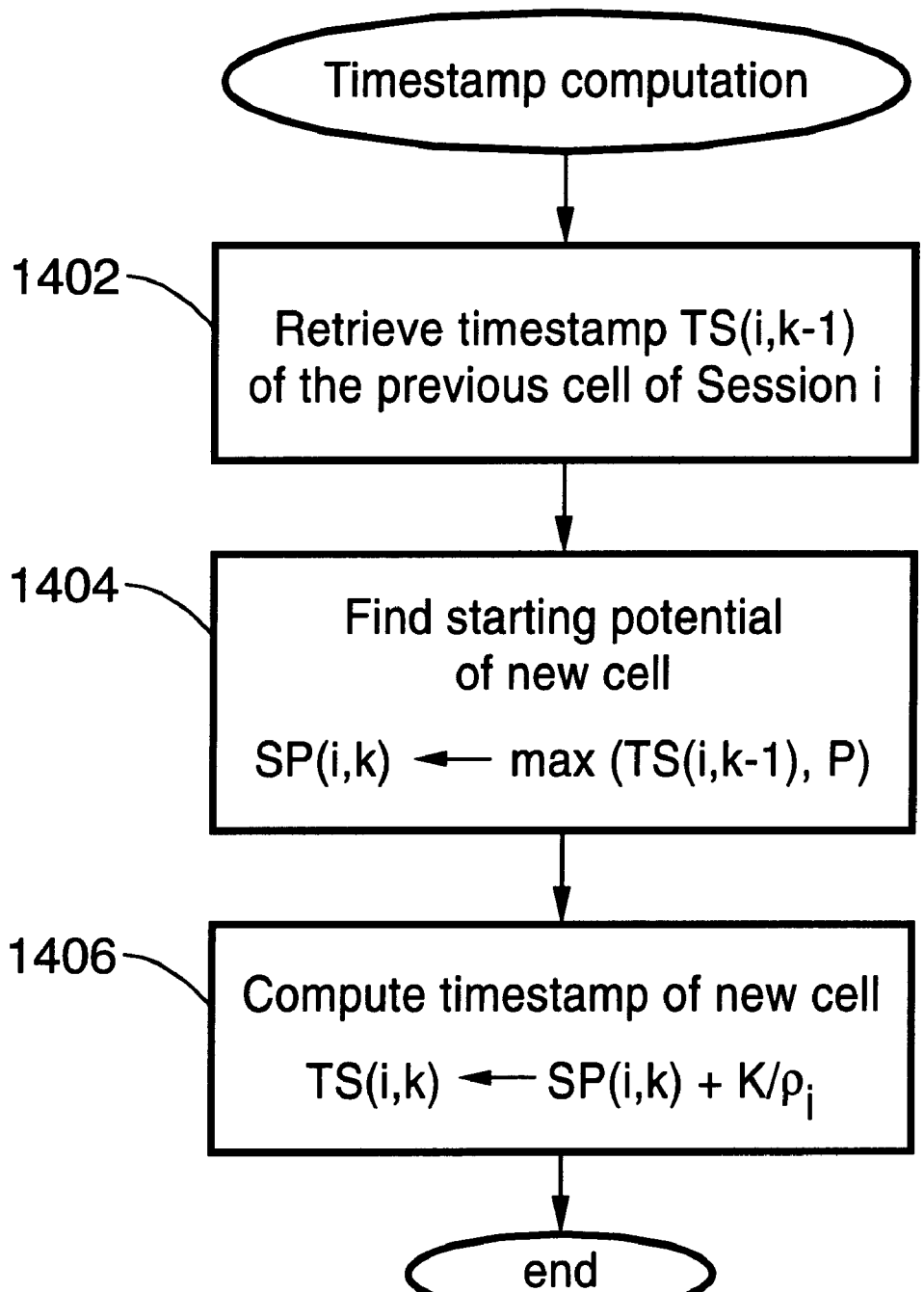
FIG. 14 is a flowchart of processing steps for computation of starting potential and timestamp in the ATM switch.

The steps involved in the timestamp computation (step 1304 of FIG. 13) are illustrated in more detail in the flowchart of FIG. 14. The starting potential is calculated as in the general case by finding the maximum of the current system potential and the timestamp of the previous cell of that connection (via step 1404). Note that the current system potential is taken simply as the current value of the variable P, which is a simplification from the general case where the partial service received by the packet currently in transmission was taken into account in the computation. The timestamp of the cell is then calculated, via step 1406 by adding the quantity $K/\rho_i$ to the starting potential. Note that, since the quantity $K/\rho_i$ is an integer, this operation involves only integer arithmetic.

Figure 15:
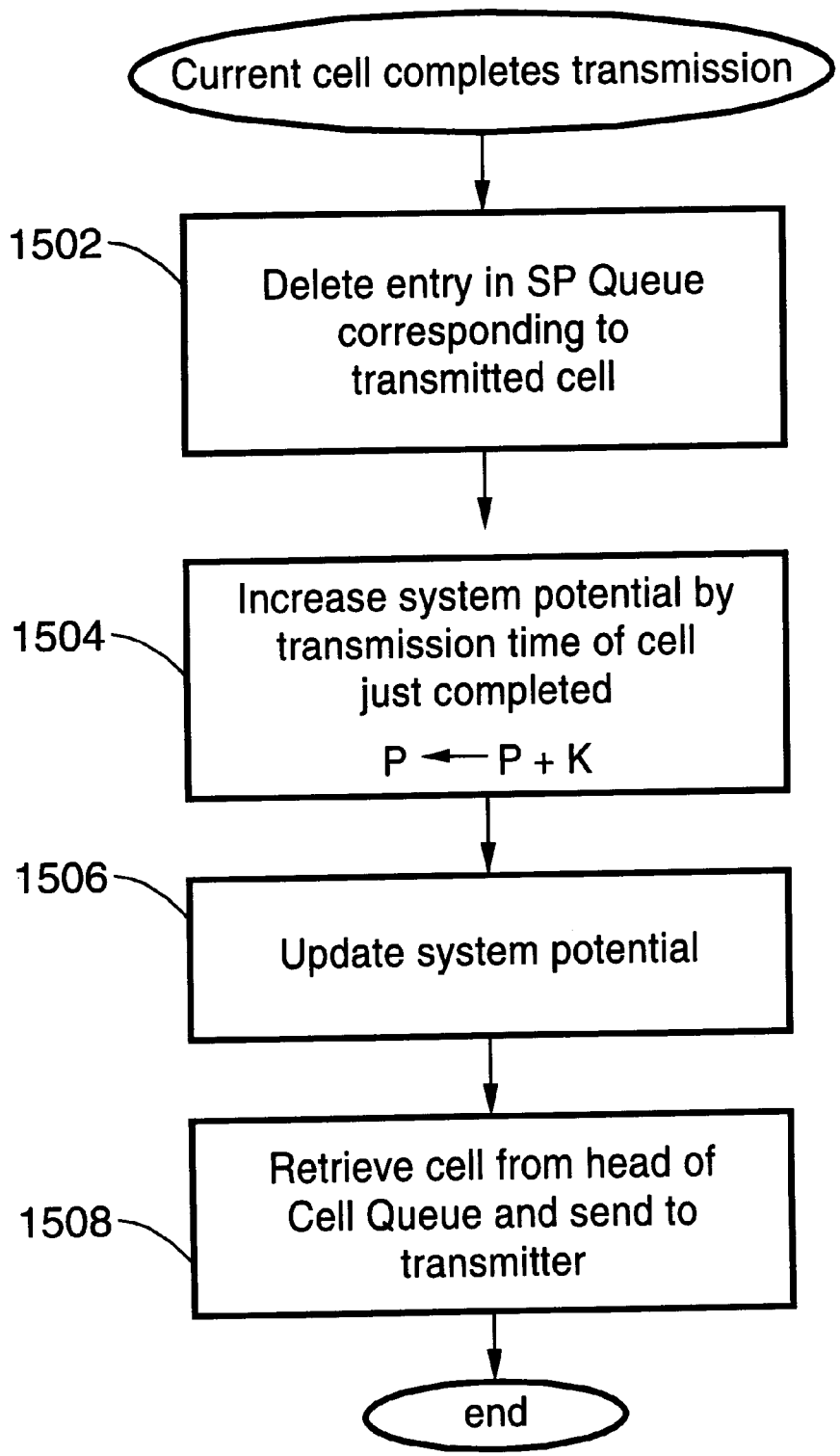
FIG. 15 is a flowchart of processing steps performed when a cell completes transmission in the ATM switch.

The second functional part of the traffic scheduling system, namely the processing that is performed when the current cell being transmitted completes its transmission, is shown in the flowchart of FIG. 15. The processing performed is similar to that in the case of general packet networks, except that some computations are simplified, again taking advantage of the fact that integers are used for representation of the system potential and timestamps. Referring now to FIG. 15, on the departure of a cell the entry corresponding to the transmitted cell is first deleted from the SP Queue via step 1502. The system potential value is then increased by the constant K, via step 1504. The next step in the flowchart performs a system-potential update operation, via step 1506. The processing involved in this step is identical to that in the case of general packet networks, shown in the flowchart of FIG. 9. Finally, the next cell for transmission from the head of the Cell Queue is selected via step 1508.

The operations in the flowcharts of FIGS. 13 and 15 are presented in pseudocode format in FIGS. 16 and 17, respectively.

Priority Queue Implementation

An essential function to be provided in both illustrative embodiments discussed earlier is that of maintaining a priority queue of packets (or ATM cells), ordered by their timestamps. In addition, a separate data structure, the SP Queue, of entries ordered by the starting potential of each packet must also be maintained. These queues can be maintained in random-access memory by the use of an appropriate data structure, such as a heap. Operations for inserting and removing cells can be accomplished by the use of well-known algorithms, illustrative examples of which can be found in "Data Structures and Algorithms," by T. Cormen, C. Leiserson and R. Rivest (New York: McGraw Hill. 1989).

When the operations of insertions and deletions are performed by software, the number of processing steps needed for each insertion or for each deletion is typically $O(\log_2 V)$, where V is the number of sessions sharing the outgoing link. This processing time may be unacceptable in a high-speed ATM network, where the time available to process cells may be very short. In this section, a hardware implementation of the Cell Queue, to be used in conjunction with our scheduling method for ATM networks will be discussed, outlined in the flowcharts of FIGS. 13 through 15. Although the description below applies to Cell Queue, a simplified method can also be used to implement the SP Queue. This implementation utilizes a set of flip-flops with some associated processing logic to implement basic operations on the priority queue.

From the previous section, let K be the constant chosen such that the values of $K/\rho_i$ for each session i is an integer. The method of implementing the priority queue is based on the fact that, in the ATM implementation, the timestamps can take only integer values. In addition, it has been shown that if only the cells at the head of each session's queue currently in the system are considered, the values of the minimum and maximum timestamps may have a difference of at most $$2 \times \max_i \left(\frac{K}{\rho_i}\right) + K$$

The maximum value of $K/\rho_i$ occurs when a session has the minimum possible reservation in the system. For example, if the minimum allowable reservation for a session is 1/1000 of the link bandwidth, then the above difference will be (2×1000+1)K=2001×K. Let W denote this maximum difference. Since the method involves modulo-W arithmetic operations, it is advantageous to choose W as a power of 2. Since only the minimum value of W is determined by the quantity in the above equation, a power of 2 can be chosen that is not less than this quantity as the value of W. In the following description we assume that W is a power of 2.

Cell Queue

If only the packets at the head of each backlogged session's queue are considered, their timestamp values must fall into a window of size W. Each distinct integer value within this window will be defined hereinafter as a slot. Thus, each slot corresponds to a unique value taken by the timestamp representation after a modulo-W operation. A given slot, say j, may be in one of two states:

1. There is no cell currently queued in the system with a timestamp value of j. In this case, the slot j is empty.
2. There is at least one cell currently in the system with a timestamp value of j. This state is designated as full.

Thus, to implement a priority queue with integer timestamps, it is sufficient to maintain a separate list for each slot. That is, the list corresponding to slot j includes cells whose timestamp value is j. Selecting cells in the order of timestamp values can be accomplished simply by scanning the slots in order and transmitting the cell associated with the first slot in the full state. Slots in empty state are skipped during the scanning. In addition, it should be noted that the cells associated with a given slot can be transmitted in any arbitrary order, since they all have the same timestamp value. Thus, the list of cells associated with each slot can be maintained in any order, for example, first-in-first-out, last-in-first-out, or any other order that facilitates a simple implementation.

Maintaining the state of each slot has the potential disadvantage that a large number of memory elements may be needed to store the states, since the timestamps of cells present in the queue at a particular instant of time may potentially fall into many different slots. However, as discussed earlier, if only the cells at the heads of each backlogged session's queue are considered, the state of only a small window of slots need be maintained, of size W. This is the basic idea behind the following method of maintaining the priority queue.

Figure 18:
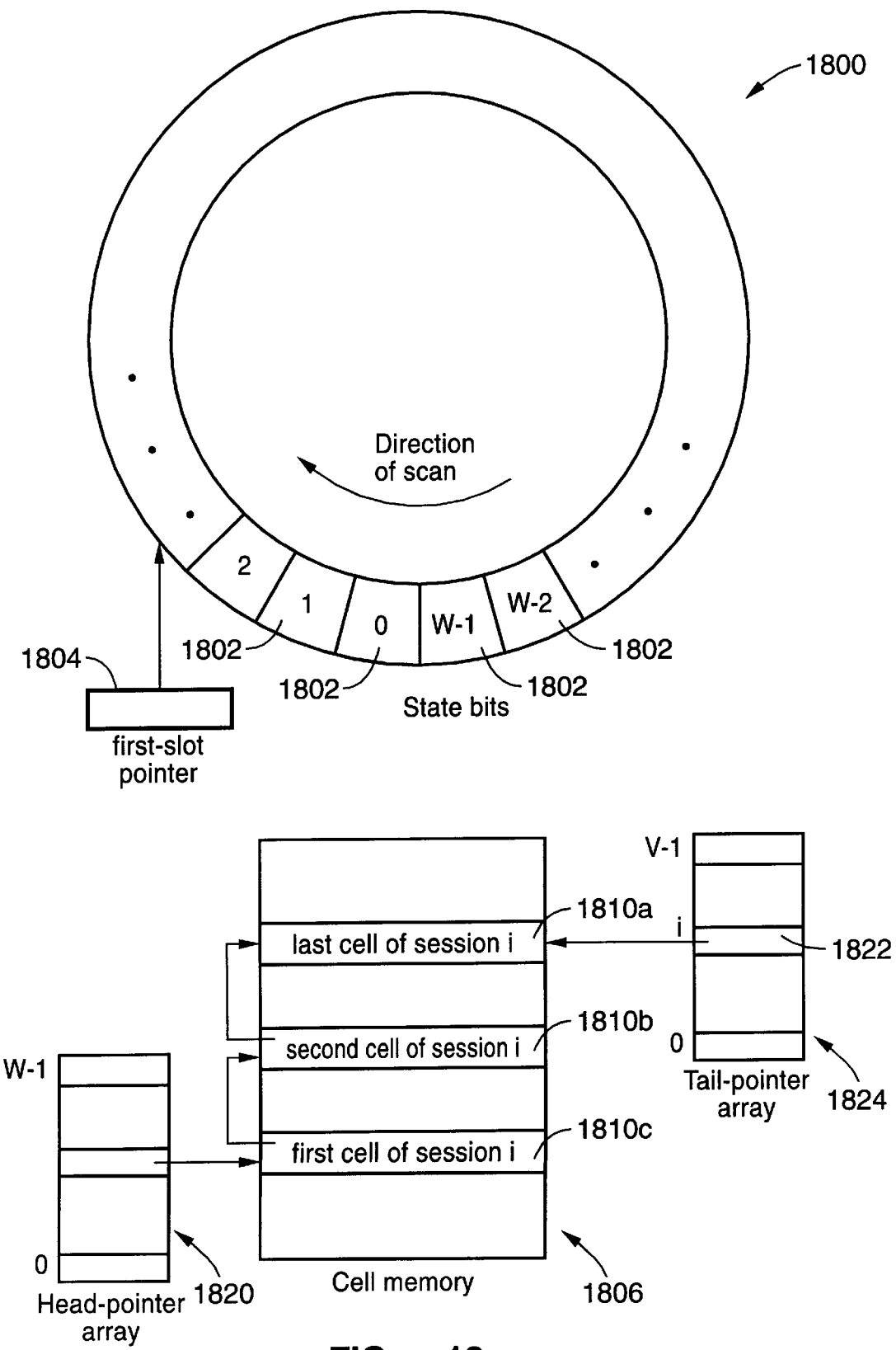
FIG. 18 is a block diagram of hardware elements implementing the Cell Queue.

The basic system for implementing the priority queue is shown in FIG. 18. The system maintains W flip-flops 1802 (or storage elements), each representing the state of a slot in the current window. The memory element is the state of the corresponding slot. The flip-flops are shown around a circle in the figure, as they are conceptually organized as a circular queue and scanned in the clockwise direction. A pointer 1804 (referred to as first-slot) points to the beginning of the current window in the scheduling system, and therefore provides the starting point for scanning the state bits within the slots. The state bits are labeled as 0 through (W−1) in the figure. The first-slot pointer 1804 is initially set to point to bit 0, and is moved cyclically as the window advances.

Figure 19:
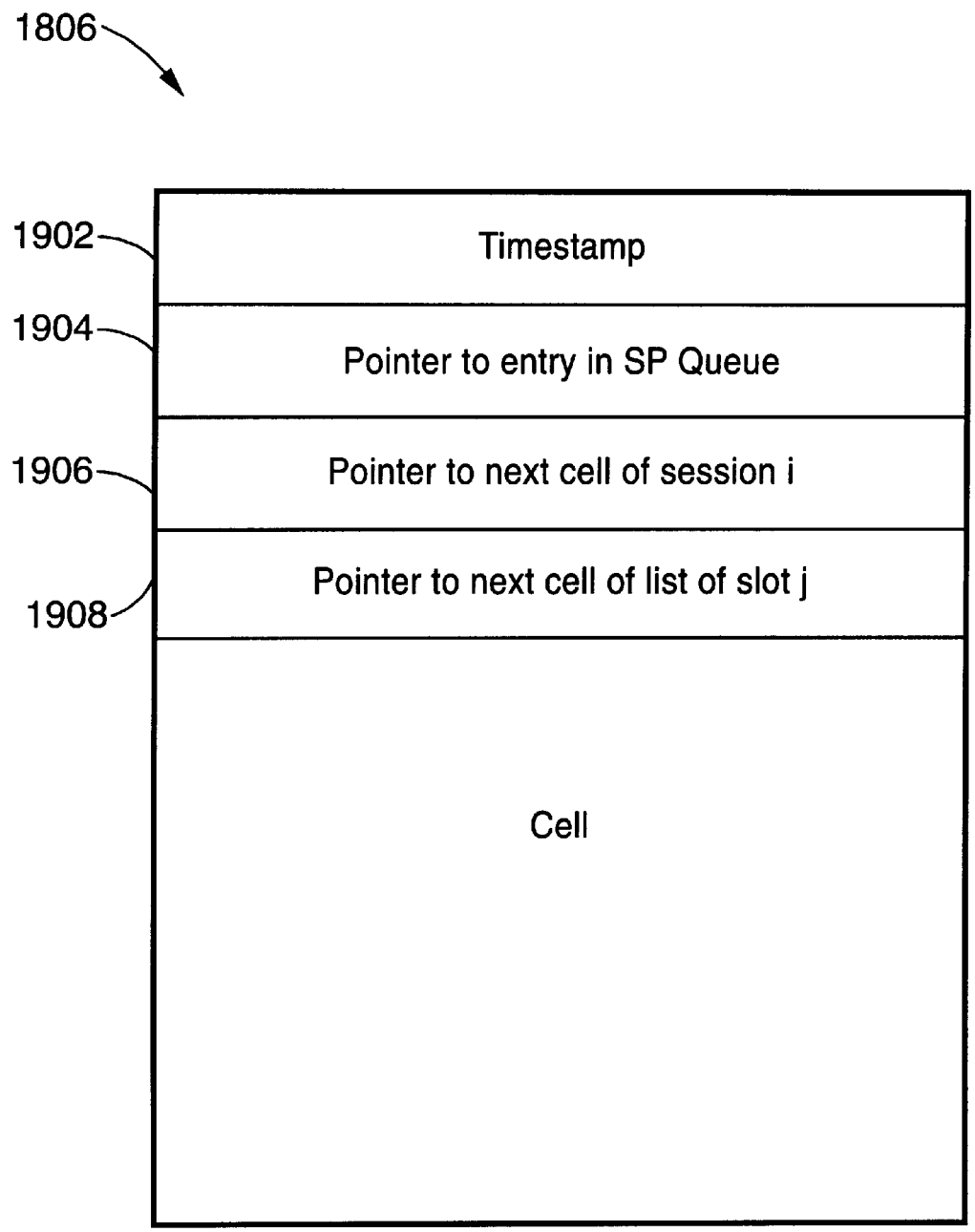
FIG. 19 shows the structure of fields stored in the cell memory.

The ATM cells 1810a–1810c buffered in the system that reside in the cell memory 1806 are also shown in FIG. 18. A number of fields are stored alongside each cell to facilitate the scheduling operations. Fields essential to this method of implementation of the priority queue are shown in FIG. 19. The fields and their associated functions are explained below:

1. The timestamp field 1902 stores the timestamp of the cell 1806 computed as per the flowchart of FIG. 14.
2. A pointer 1904 to the entry in the SP Queue corresponding to the cell.
3. A pointer 1906 to the cell-memory location where the next cell of the same session is queued. This pointer enables a linked-list to be maintained, consisting of all the cells of a given session, in the order in which they arrived.
4. A second pointer 1908 to the cell-memory location where a cell with the same value of the timestamp is stored. This pointer 1908 links all the cells with the same value of timestamp to be linked together.

It should be noted that, instead of storing the above fields alongside the cell in cell-memory, they could also be stored in a separate control memory as a separate data structure and linked to the cell in cell-memory. This particular method of storage has the advantage that cell data can be accessed in parallel with the information contained in the above fields.

Each of the state bits in the circular array can be in one of two states: empty or full. If the state of a slot is empty, there are no cells queued with a timestamp value corresponding to that slot. If the state is full however, there is at least one cell with a timestamp value corresponding to the slot. Since there may be more than one such cell in the system with a timestamp value corresponding to the slot, a list of such cells needs to be maintained. This is accomplished with an array of pointers, designated as the head-pointer array 1820 in FIG. 18. This array consists of a total of W pointers, and each has a one-to-one correspondence with one of the state bits. The pointer at location j of the array points to a location in cell in memory where a cell with timestamp value j (modulo W) is stored (If there are no cells in the system with this timestamp value, a NULL pointer is stored). Thus, when the state of a particular slot j is determined to be full the corresponding pointer from the head-pointer array provides access to the list of cells with timestamp j (modulo W). As explained earlier, this list may be maintained in any order, such as first-in-first-out, or last-in-first-out Referring again to FIG. 18, the array of pointers labeled as tail-pointer array 1822 is used to identify the locations of the last cell received from each session. Thus, if there is a total of V sessions sharing the outgoing link, there are V pointers stored in this array. The pointer 1822 at location i of the array points to the location in cell memory 1810c where the last cell received from session i is stored. When a new cell is received, this pointer 1822 is used to add the new cell to the end of the list of cells maintained for the session to which the cell belongs.

Figure 20:
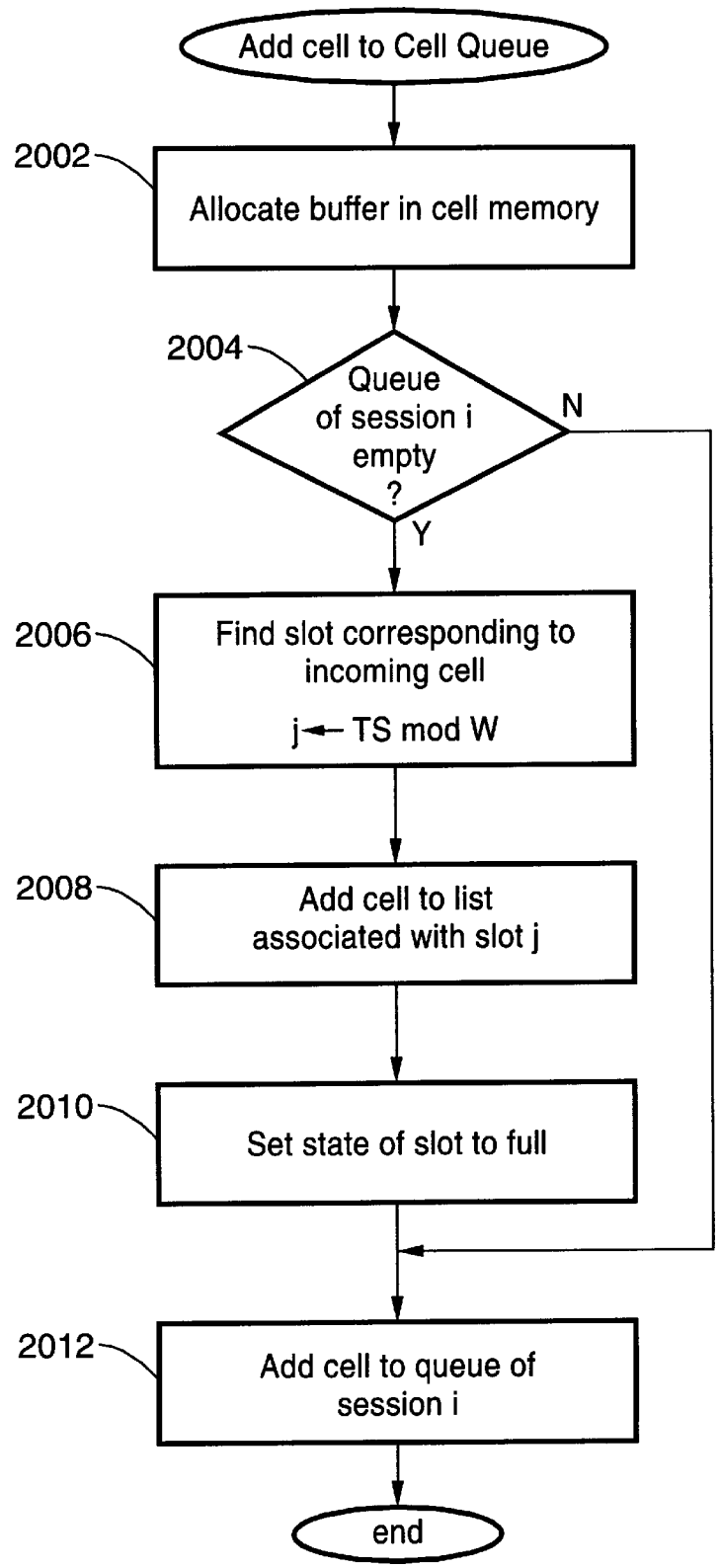
FIG. 20 is a flowchart of processing steps for adding a cell to the Cell Queue.

Having described the hardware elements in FIG. 18, the processing steps that are performed for adding a new cell to the priority queue, and for removing a cell from the head of the queue for transmission will now be described. These processing steps can be performed either by a processor executing software instructions or by the use of state machines. The processing steps that are performed while adding a new cell to the priority queue are shown in FIG. 20, and will be described next. It should be noted that these steps together form the processing step 1306 of the flowchart of FIG. 13.

Referring to the flowchart of FIG. 20, the first step in adding a new cell to the priority queue is to allocate a buffer in the cell memory via step 2002. This can be achieved by maintaining a list of empty buffers in the cell memory, from which one is allocated to the newly-arrived cell. A test is then performed to determine if any cell from the same session is currently queued in the system via step 2004. Assuming that the new cell belongs to a session i, this test is easily performed by examination of the ith element of the tail-pointer array, which points to the last cell of session i. If this element is found to be NULL, the new cell is determined to be the only cell from session i currently in the system.

If one or more previous cells from session i are queued in the system, the only processing step needed is to add the new cell to the queue of session i via step 2012. This is accomplished by storing the new cell in its allocated location in cell memory and updating pointer values. The pointer update operations consist of first setting the pointer field of the last cell of session i currently stored in the system to point to the newly arrived cell, and then updating the ith element of the tail-pointer array to point to the new cell. These operations are embodied in step 2012 of the flowchart in FIG. 20.

If no previous cells from session i are currently queued in the system, the additional processing steps of 2006, 2008 and 2010 must be performed. These steps are required to ensure that the first cell in each session's queue is included in one of the lists attached to the W slots, so that it is a candidate for selection of the cell with the smallest timestamp value. The newly arrived cell is added to the list of cells with the same timestamp value (modulo W) as follows: First, the slot number corresponding to the timestamp value of the new cell is found in the variable j by performing a modulo-W operation via step 2006.

Since W is a power of 2, that is $F=2^b$, this operation is equivalent to using the least significant b bits from the timestamp as the slot number. The new cell is then added to the list of cells currently maintained for that slot via step 2008. For illustration, let j be the value embodied in the least significant b bits of the timestamp of a newly arrived cell. The cell is then added to the list associated with slot j at its head. This can be achieved in a constant number of processing steps by setting the j-th element of the head-pointer array to point to the location of the new cell in cell memory, and the pointer field 1908 of FIG. 19 associated with the new cell to the previous value of the head-pointer j. This adds the new cell the head of the list associated with slot j. Alternately, the new cell can be added to the tail of the list if a separate array of pointers is maintained, each pointer j pointing to the last cell in the list of cells associated with slot j. It should be noted that this choice has no effect on the delay guarantees provided by the scheduling method.

Finally, the state bit for slot j is set to the full state, indicating that one or more cells are queued with a timestamp value corresponding to that slot number via step 2010.

The second operation that needs to be supported by the priority queue is the selection of the cell with lowest timestamp value, as stated in step 1508 of FIG. 15.

Figure 21:
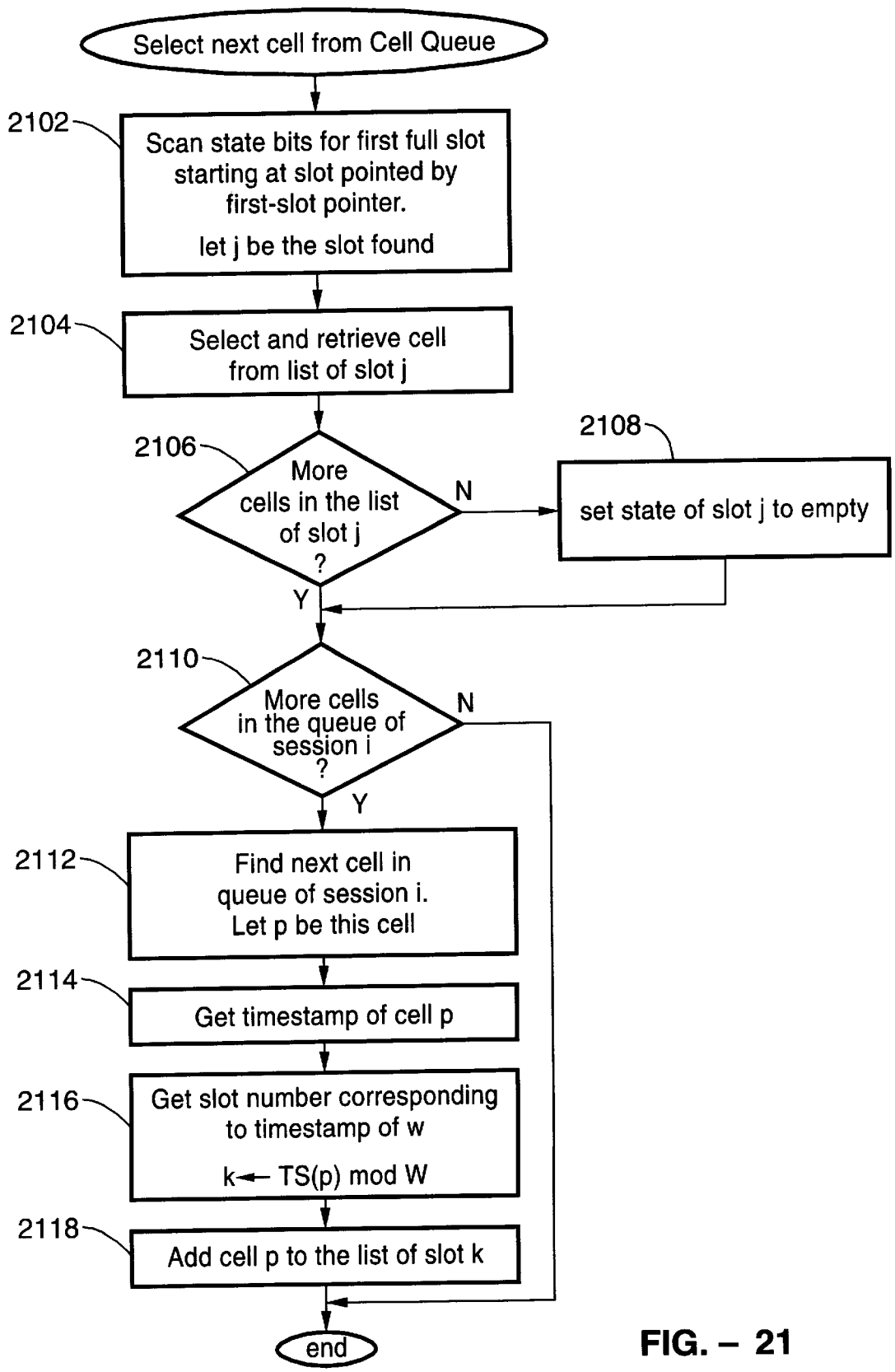
FIG. 21 is a flowchart of processing steps for selecting and transmitting a cell from the Cell Queue.

FIG. 21 shows the processing steps performed for selection of the cell with the smallest timestamp value for transmission and updating the state of the queue after removing the selected cell from the system. The selection process is performed by scanning the state bits, starting from the slot pointed by the first-slot pointer and proceeding cyclically through the array of state bits via step 2102. The first slot found in full state corresponds to the minimum timestamp value currently in the system. It can be shown that, starting from the slot pointed by the first-slot pointer, a full slot can be found within the current window, unless the system is empty.

Assume, for illustration, that the first slot found to be full is j. The next cell is selected for transmission from the list of cells associated with slot j via step 2104. This can be accomplished by choosing the cell pointed by the jth element of the head-pointer array, removing the cell from the cell memory, and updating the jth element of the head-pointer to the next cell in the list. This next cell is obtained from the pointer field 1908 (FIG. 19) of the selected cell. It should be noted that, instead of the cell pointed by the jth element of the head-pointer array, any cell that is part of the list starting at this cell may be selected for transmission, since all such cells have the same timestamp value.

After removing the selected cell, steps 2106–2118 update the state of the system. First, steps 2106 and 2108 are used to set the state of slot j to empty if the selected cell was the only one in the list corresponding to slot j (that is, no other cells are queued in the system with the same timestamp value).

It was mentioned earlier that the cell at the head of the queue of each session must be maintained as part of the list of cells associated with one of the W slots, so that it would be considered as a candidate during the selection process. Therefore, when the cell at the head of the queue of a session is removed for transmission, the next cell in its queue (if any), must be added to one of the lists associated with the slots. This is the objective of steps 2110–2118 of the flowchart. Assume, for illustration, that the cell currently selected belongs to a session i. While removing the currently selected cell from cell memory, its pointer field 1906 (FIG. 19) is used to determine the location in cell memory of the next queued cell of session i. If this pointer is NULL, no further action is required. Otherwise, the timestamp of this cell now appearing at the head of the queue is read and the corresponding slot number is determined by performing a modulo-W operation. Let k be the slot number so obtained. The cell is then added to the list associated with the slot k in the same manner as explained in step 2008 in FIG. 20.

An additional step when the embodiment of FIG. 18 is used to implement the Cell Queue, is to update the first-slot pointer. This is done whenever the system potential is increased. Referring to the flowchart of FIG. 15, when the system potential is increased by K is step 1504, the first-slot pointer is also incremented by K, modulo W. Likewise, if the system-potential update operation in step 1506 increases the system potential, the first-slot pointer is also incremented by the same amount, modulo W.

Figure 22:
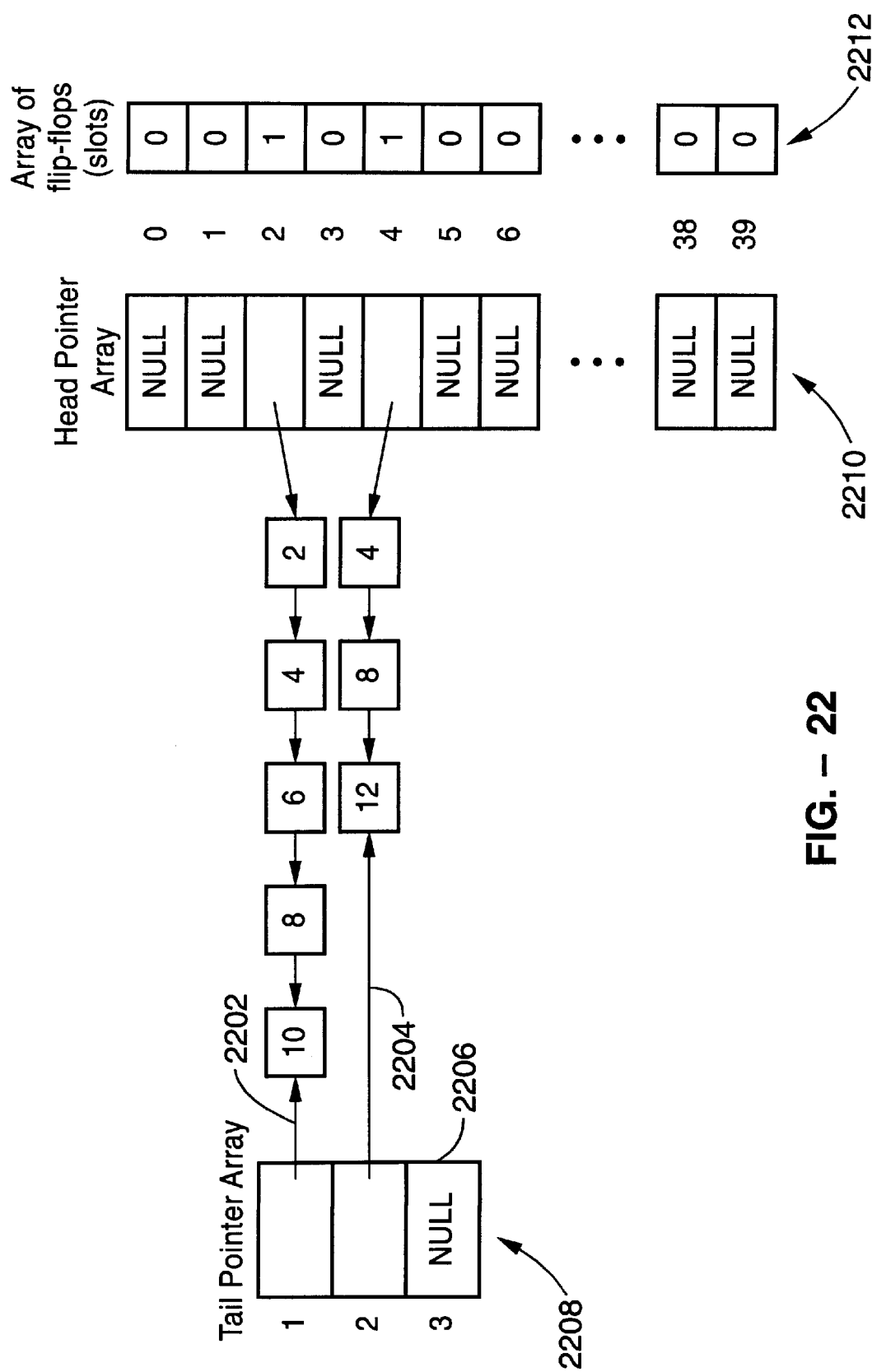
FIG. 22 is an example for operation of the hardware implementation of the Cell Queue: Initial state at time t=0.

The operations involved in this priority queue implementation, described in the flowcharts of FIGS. 20 and 21 are now illustrated with an example. In FIG. 22 the state of an example system at time t=0 is shown. It is assumed that the parameter W is set to 40 and K to 1. Thus, as was described earlier, the head-pointer array must have at least 40 elements. There are three connections 2202, 2204 and 2206 sharing the same outgoing link, whose bandwidth capacity is 1 unit. Connection 2202 has reserved 50% of the bandwidth of the outgoing link, whereas connections 2204 and 2206 have each reserved 25% of the bandwidth. The tail-pointer array 2208 has one pointer associated with each connection. It is assumed that the system was idle before time 0. At time t=0, five cells arrive in the queue of connection 2202 and three cells in the queue of connection 2204, as shown in FIG. 22. The queue of connection 2206 remains empty. Assume that each of the arrived cells is of length 1 unit.

In FIG. 22, the tail-pointer corresponding to connection 2202 is pointing to the last cell that arrived from that connection. The same holds for the tail pointer associated with connection 2204. Notice, however, that the tail pointer associated with connection 2206 is NULL. The first cell in the queue of connection 2202 has a timestamp equal to 2. Therefore, element number 2 of the head-pointer array 2210 is pointing to that cell. Similarly, element number 4 of the head-pointer array 2210 is pointing to the first cell of connection 2204. The states of the array of flip-flops 2212 (slots) are also shown in FIG. 22. Only the flip-flops 2212 in positions 2 and 4 are set to 1 (full), whereas all other flip-flops 2212 are set to 0 (empty).

Figure 23:
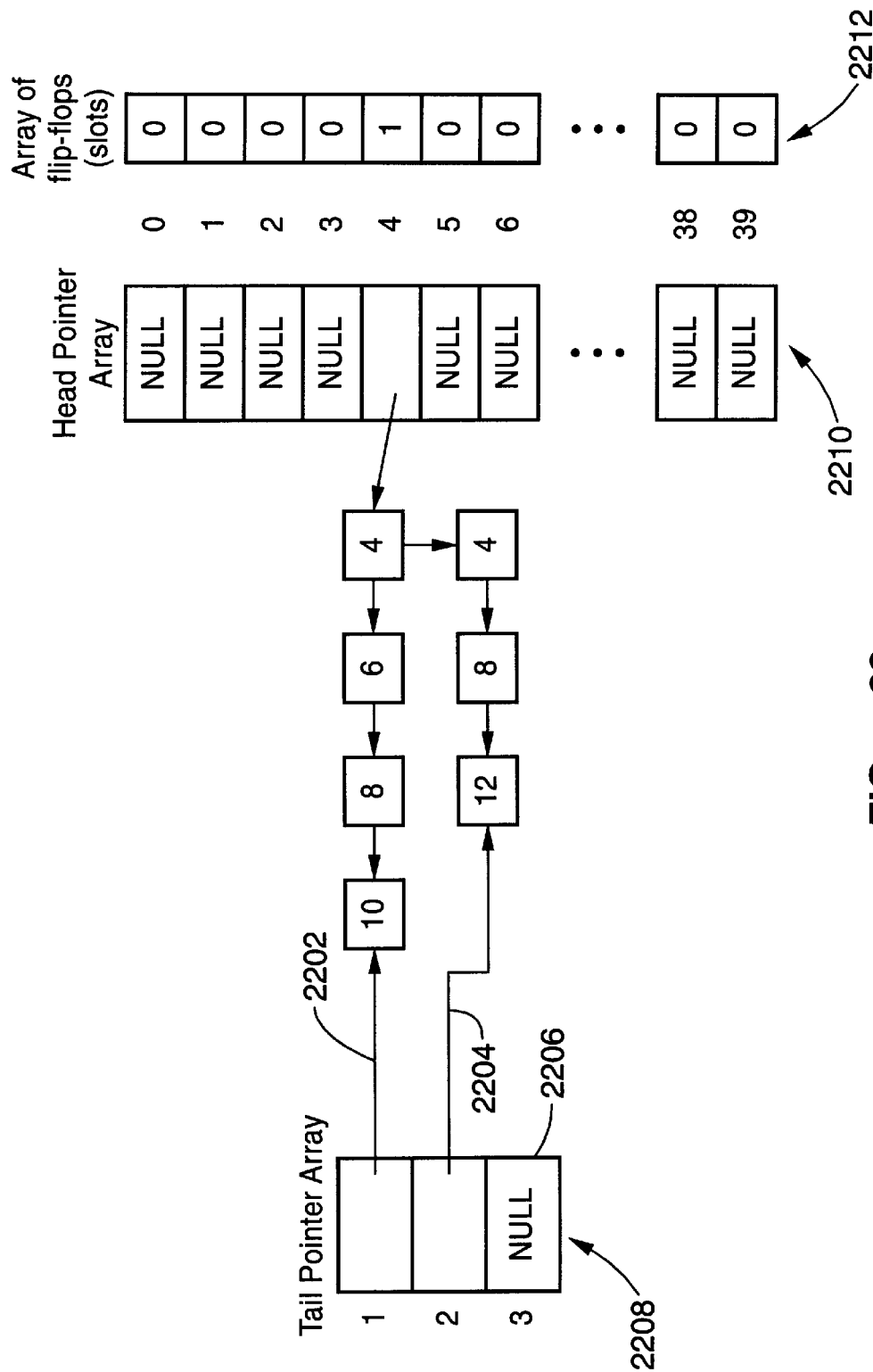
FIG. 23 is an example for operation of the hardware implementation of the Cell Queue: State at time t=1 after transmission of first packet.

At time t=1, the cell with the minimum timestamp will finish transmission. FIG. 23 shows the state of the system after the first cell is transmitted. The cell that was just transmitted is the first cell of connection 2202, and had a timestamp of 2. Since there is no other cell with a timestamp equal to 2, the corresponding head-pointer now becomes NULL and the corresponding flip-flop 2212 is set to 0 (empty). The next cell in the queue of connection 2202 now moves to the head of its queue. This next cell has a timestamp of 4 and therefore must be added to the corresponding queue associated with the pointer at the 4th position in the head-pointer array 2210. This can be done in constant time by making the pointer number 4 in the head-pointer array 2210 to point to that cell and creating another pointer from that cell, to the cell that was previously pointed by the pointer number 4. The resulting structure is shown in FIG. 23.

Figure 24:
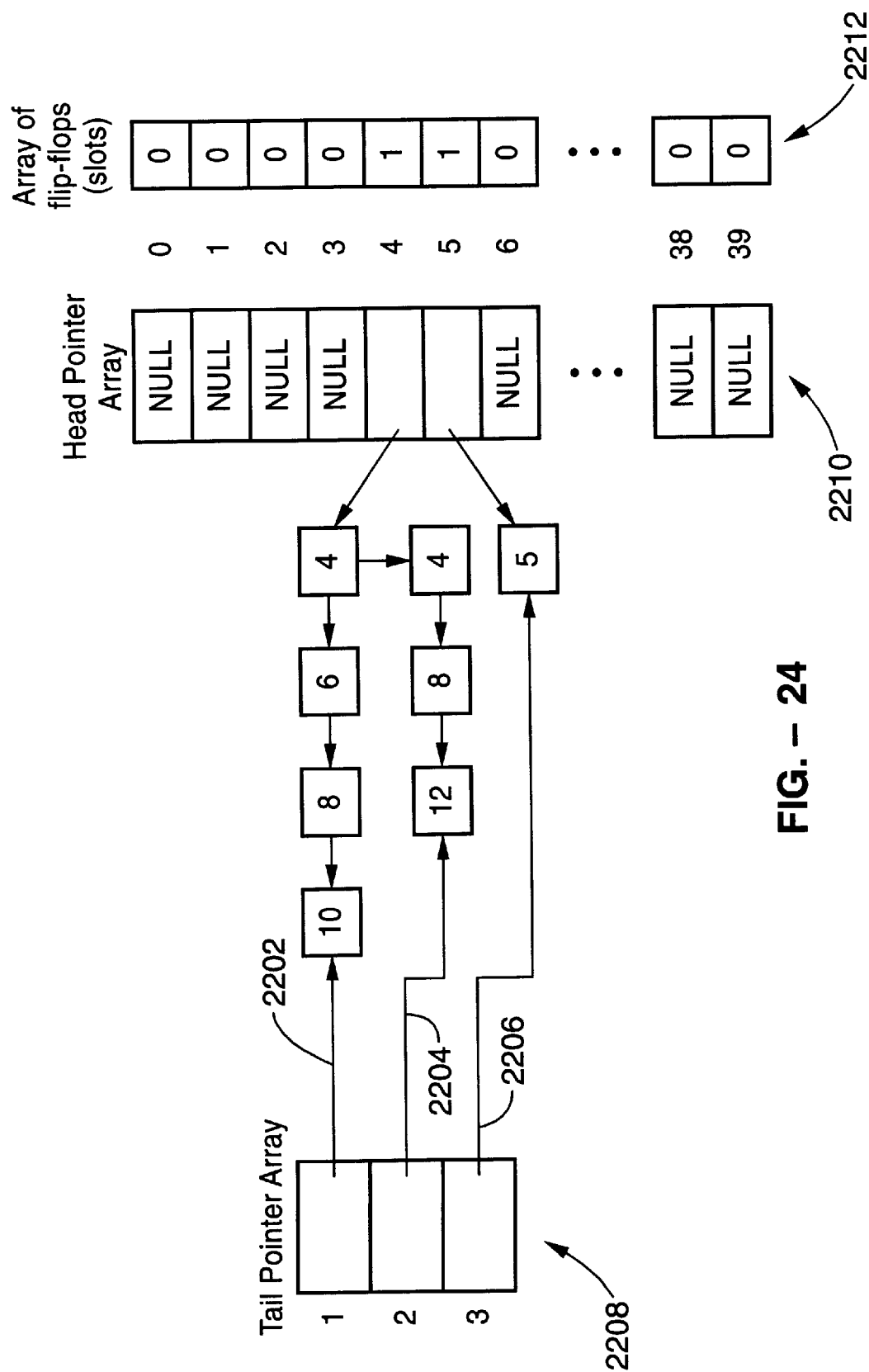
FIG. 24 is an example for operation of the hardware implementation of the Cell Queue: State after packet arrival from Connection 3.

It is now assumed that a cell from connection 2206 arrives at this time, that is, at time t=1. Recall that since only one cell has been transmitted from the time that the system became busy, the current value of system potential is thus equal to 1. Therefore, the cell that arrived in the queue of connection 2206 will be assigned a timestamp equal to 1+(1/0.25)=5. Since the new cell is both the first and last cell from connection 2206, the tail-pointer associated with connection 2206 must be made to point to this cell. In addition, the head-pointer that corresponds to a timestamp value of 5 must point to this cell as well. The configuration of the system after the addition of the cell is presented in FIG. 24.

A basic operation required in the above embodiment of the priority queue is the selection of the first slot in the full state. A serial scan operation for this would require O(W) steps in the worst case. A simple hardware circuit that allows a more time-efficient hardware implementation is now described. This module will be referred to as the "selector module."

Figure 25A:
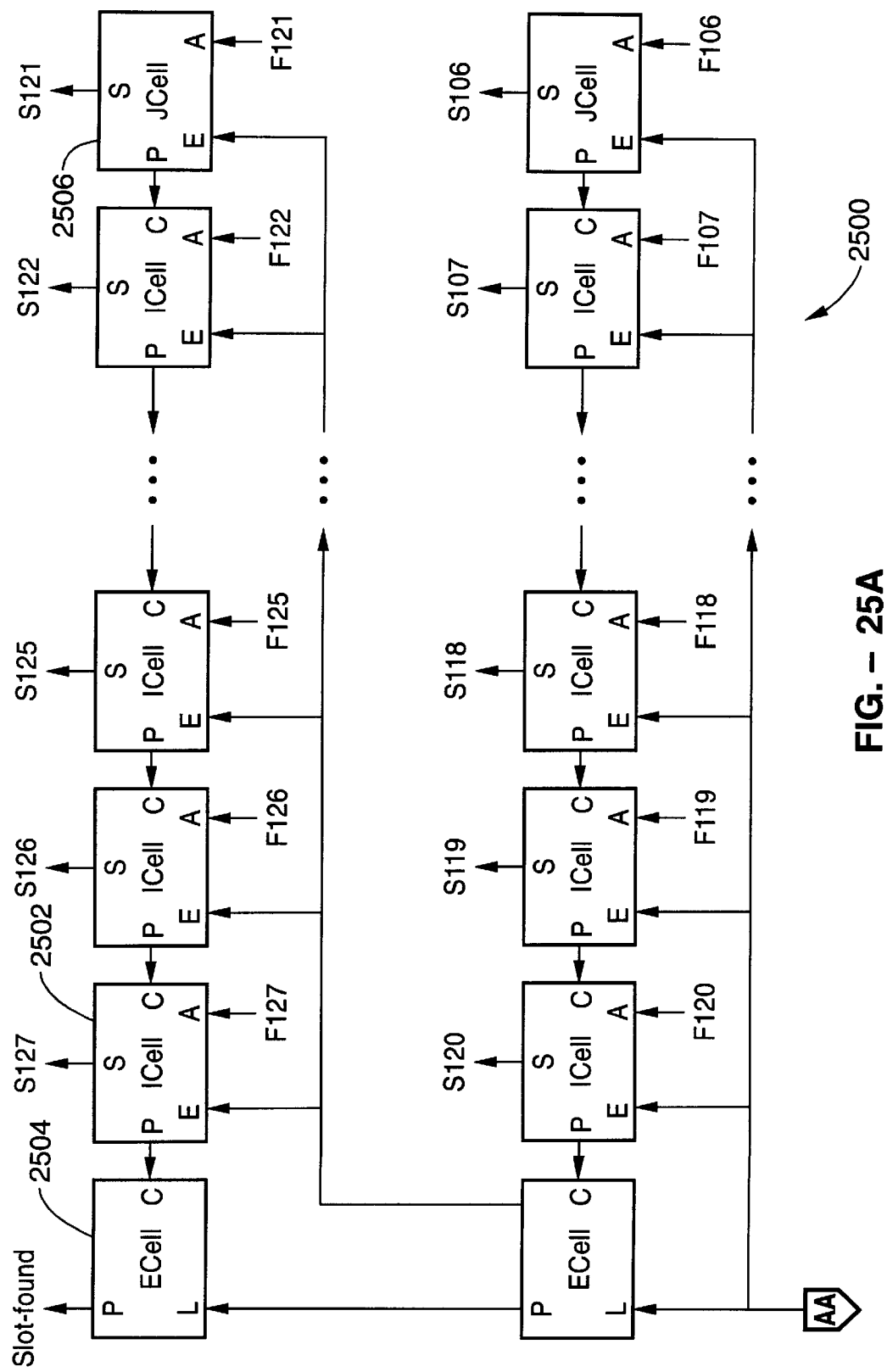
FIG. 25 is a block diagram of an example selector module for an ATM switch in accordance with the present invention.
Figure 25B:
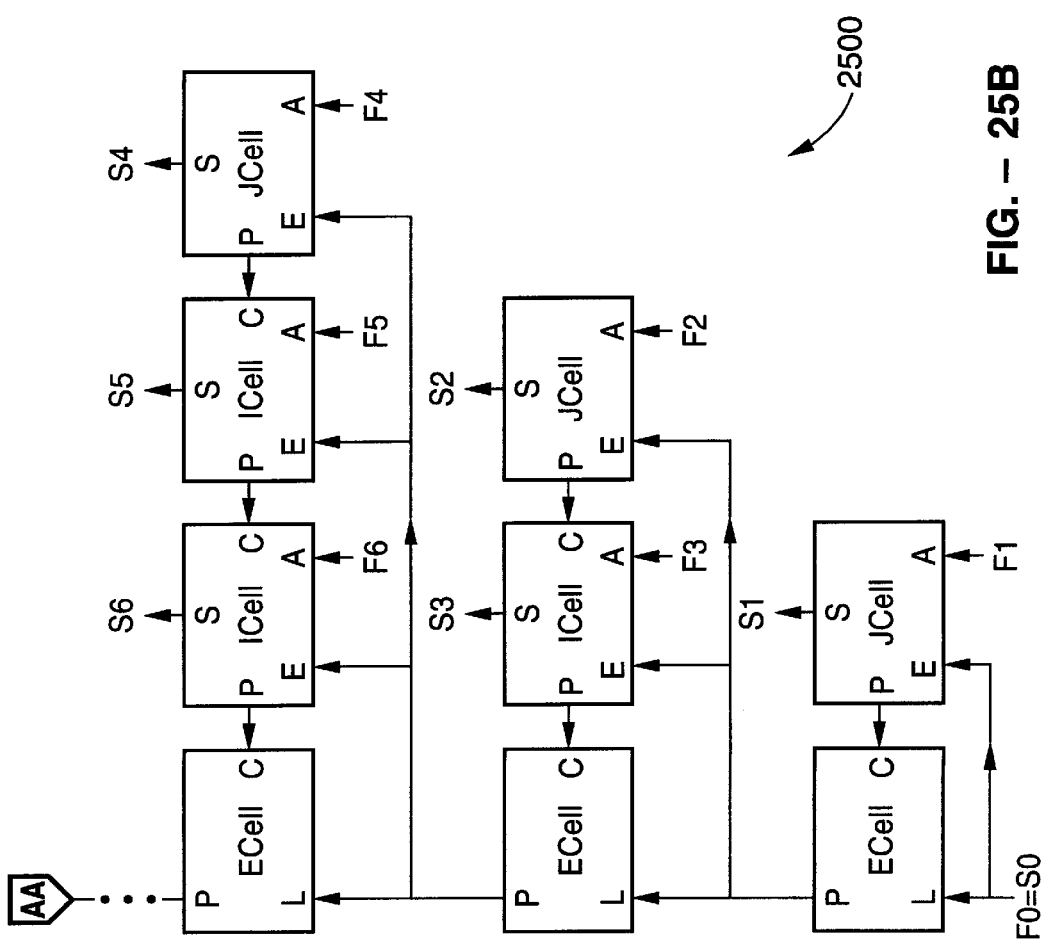

A block diagram of the selector module 2500 is shown in FIG. 25. Given the state of W consecutive slots in a frame, the module identifies the first full slot in the array 1802. The selector module is constructed from a triangular array of logic elements 2506, in this example, F=128. The signals F0–F127 correspond to the states of the 128 slots, with 0 representing the empty state and 1 the full state. The module generates output signals S0–S127 such that the following conditions are satisfied:

1. If all the input signals F0–F127 are zero, all the output signals S0–S127 are also zero.
2. If one or more of the input signals F0–F127 are 1, exactly one of the output signals, say $S_i$, is a 1 and the rest of the output signals are zero. The 1-output appears at the position corresponding to the first input signal that is a 1.

Thus, the output signals S0–S127 can be encoded using a simple binary encoder to obtain the binary representation for the slot number selected.

Three distinct types of cells are used in the implementation of the selector in FIG. 25, the I cell 2502, the E cell 2504 and the J cell 2506, depending on their location. These cells propagate logic signals through the array from right to left and bottom to top. The three distinct types of cells are characterized by their distinct cascading signals and the logic functions performed: The logic operations performed by each of these cells is as per the following equations, where the operator "+" denotes a logical OR operation, symbol "." represents a logical AND, and the notation $\bar{x}$ represents the logical NOT operation.

$$J\text{-Cell}: P=E+A; S=A\cdot \bar{E}$$

$$I\text{-Cell}: P=E+A+C; S=A\cdot \overline{(C+E)}$$

$$E\text{-Cell}: P=C+L$$

The longest-delay path in this selector module passes through 17 logic cells. For the general case, it can be shown that the longest delay is of the order of the square root of W.

The selector module 2500 in FIG. 25 can be used in conjunction with additional logic to implement still larger selector modules by organizing the state bits into groups. For example, if the window consists of 1024 slots, the 1024 slots can be organized as 128 groups, each consisting of 8 state bits. The selector module in FIG. 25 can then be used to determine the first group with a full slot among the 128 groups. The first full slot within the selected group can then be found in a second step using additional logic.

It should be noted here that a number of other hardware approaches may be used to implement this selection process. For example, a tree structure of selectors could be used. A serial architecture may be used as well.

SP Queue

As mentioned in the detailed description of the embodiment, a separate priority queue is required for determining the minimum starting potential of cells currently queued in the system. Notice that the starting potential of any cell in the head of the queue of each session will fall within the same window W as the finishing potential. From the description of the algorithm, it is necessary to know the value of the minimum starting potential. However, we do not need to identify the cell(s) associated with this minimum value.

The starting potential of any cell will be represented by an integer value within the window W. Again, each distinct integer value within this window is referred to as a "slot." Thus, each slot corresponds to a unique value taken by the starting potential. A given slot, say j, may be in one of two states:

1. There is no cell currently queued in the system with a starting potential value of j. In this case, the slot j is empty.
2. There is at least one cell currently in the system with a starting potential value of j. This state is designated as full.

A counter is associated with every slot, and its value represents the number of connections that have a starting potential associated with that slot. The basic difference with the implementation of the Cell Queue is that we do not need to identify the cells associated with that starting potential, but only whether there is at least one cell with a starting potential in the current slot.

Figure 26:
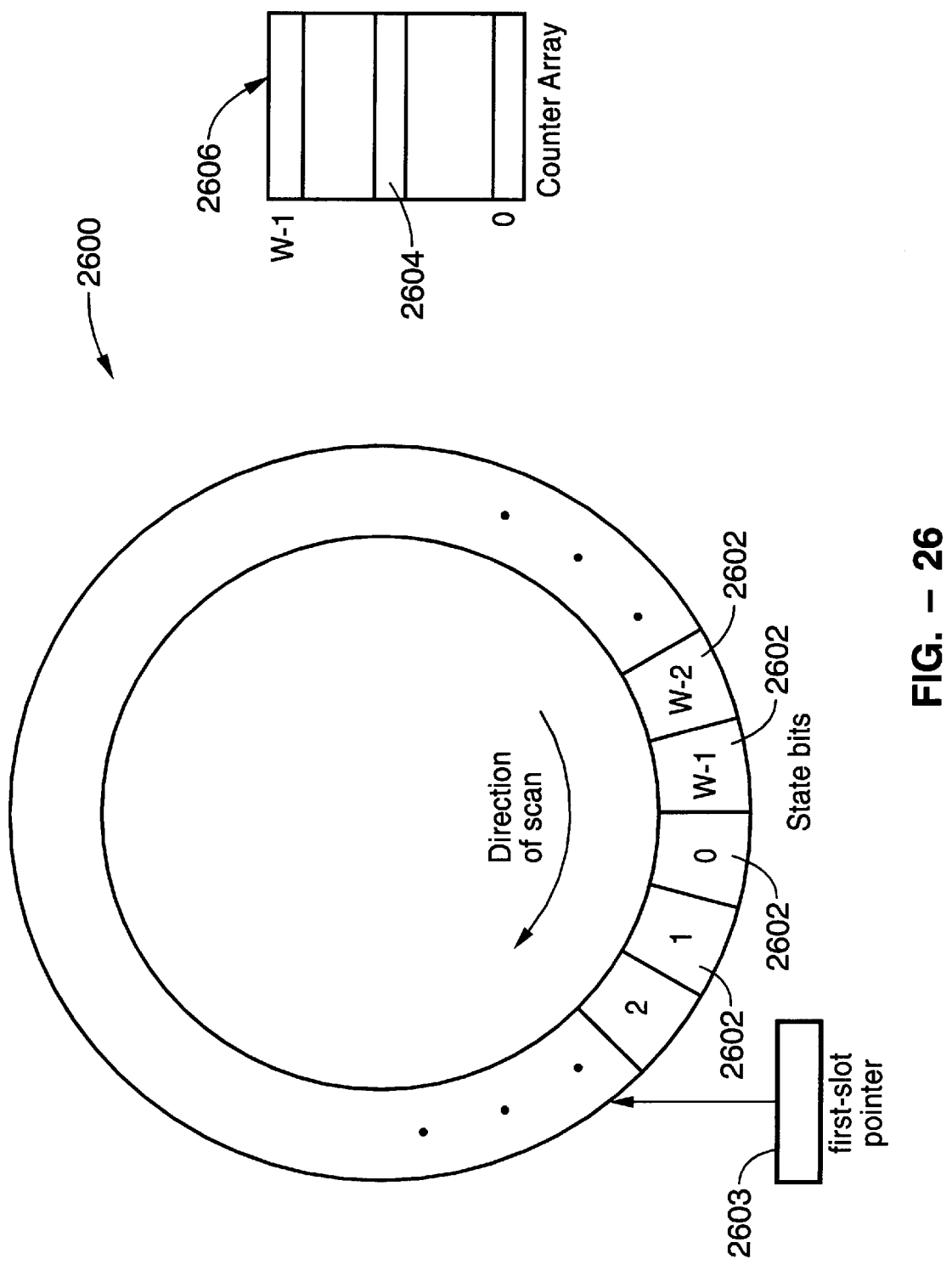
FIG. 26 is a block diagram of the SP Queue for an ATM switch in accordance with the present invention.

An illustrative embodiment of the architecture of the starting potential (SP) queue 2600 is presented in FIG. 26. The system maintains W flip-flops 2602, each representing the state of a slot in the current window via a first slot pointer 2603. It also includes a set of counters. Each counter 2604 in the Counter Array 2606 is associated with one of the flip-flops of the current window and maintains a count of the number of cells in the SP Queue with their starting potential (modulo W) equal to the index of the counter.

Figure 27:
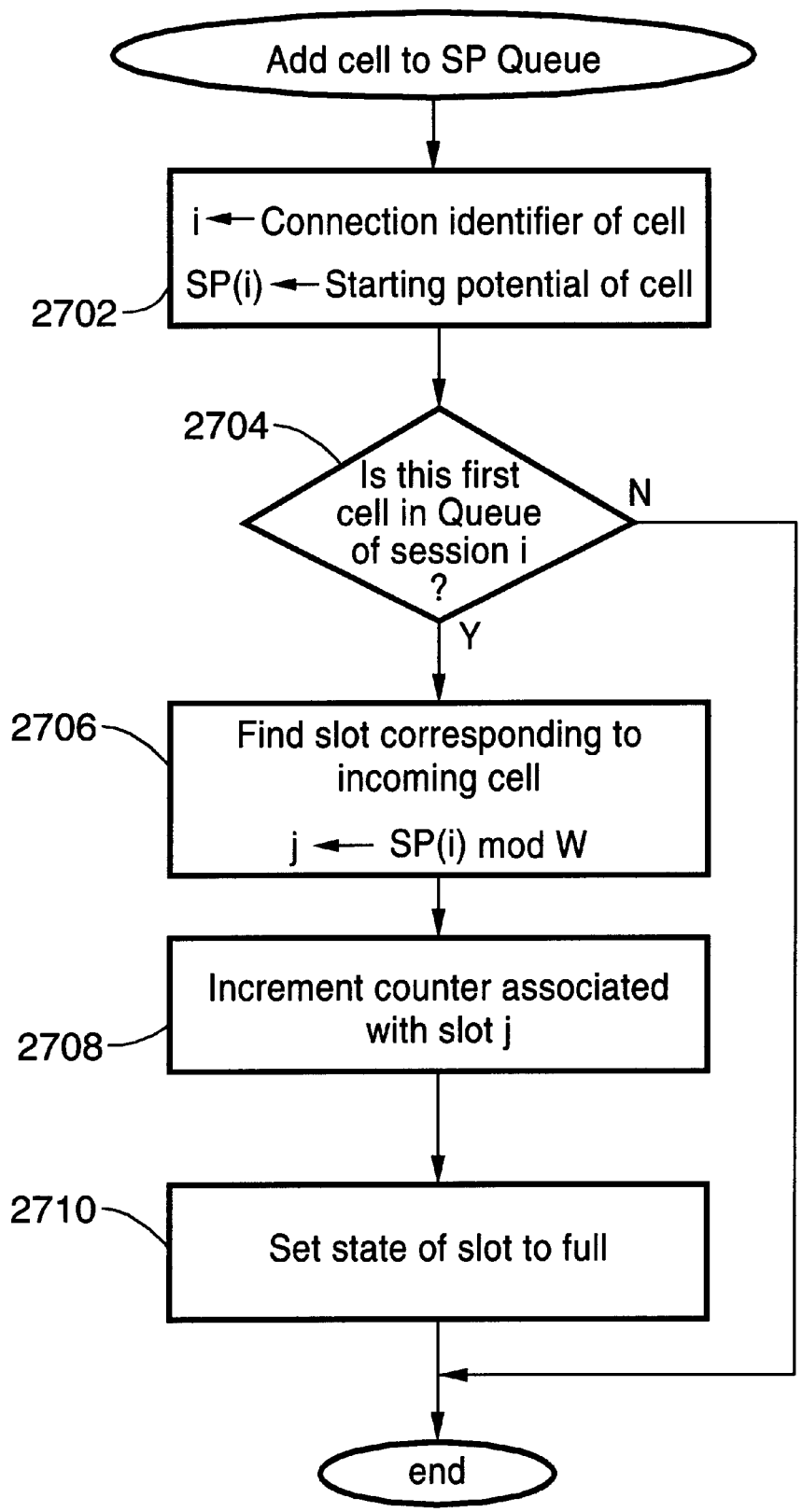
FIG. 27 is a flowchart of processing steps for adding an entry to the SP Queue.

The operation of inserting the starting potential of a newly arriving cell in the SP Queue (required in step 1308 of FIG. 13) is outlined in the flowchart of FIG. 27. Referring now to FIG. 27, the queue associated with the session of the incoming cell is first checked via step 2704. If the arriving cell is the first cell of the queue, then the SP queue must be updated via steps 2706 through 2710. The slot associated with the starting potential of the incoming cell is first determined by a modulo-W operation via step 2706. The counter 2604 associated with that slot is incremented by 1 via step 2708 and the state of the slot is set to full via step 2710.

Figure 28A:
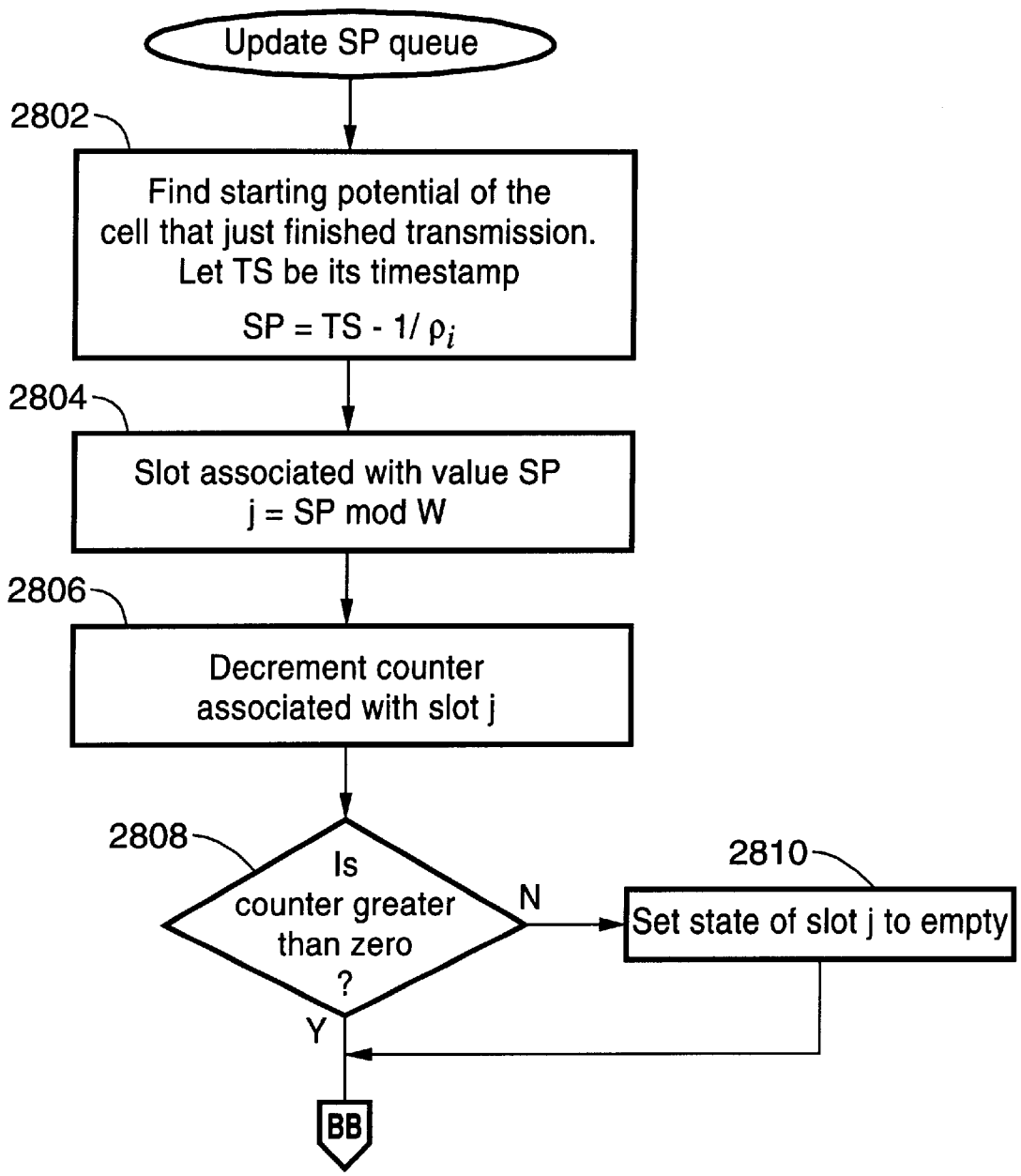
FIG. 28 is a flowchart of processing steps for removing an entry from the SP Queue.

An update operation in the SP Queue is also required as described in step 1502 of FIG. 15, upon transmission of each cell. This update operation is outlined in FIG. 28. The starting potential of the cell that just finished transmission is calculated via step 2802. The counter 2604 associated with the slot that corresponds to this starting potential is then decreased by one via step 2806.

If the counter becomes zero, the state of the corresponding slot is set to empty via step 2810. If there are more cells in the queue of the session that just transmitted the cell, the next cell in the session's queue must now be added to the SP Queue. This is achieved via steps 2814 through 2820. The timestamp of the next cell is first retrieved via step 2816. The starting potential is calculated from the timestamp and used to determine the slot number corresponding to the cell via step 2818. The counter associated with the slot so found is increased by one, and the state of the slot is set to full, via step 2820.

The final operation that needs to be supported by the priority queue is the determination of the minimum starting potential value among the queued cells that is required for updating the system potential. The process is performed by scanning the state bits, starting from the slot pointed by the first-slot pointer and proceeding cyclically through the array of state bits. The first slot found in full state corresponds to the minimum starting potential currently in the system. It can be shown that, starting from the slot pointed by the first-slot pointer, a full slot can be found within the current window, unless the system is empty. This operation can be performed efficiently with a hardware module similar to that of FIG. 25.

SUMMARY

A system and method in accordance with the present invention improves upon the fairness properties of a conventional scheduling system. In contrast with Weighted Fair Queueing that requires in the worst-case time proportional to the number of sessions that share the link, the timestamp calculation in the disclosed method is completed in O(1) time. Therefore, the implementation of traffic scheduling system and method in accordance with the present invention is significantly superior.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A scheduling method for receiving a plurality of data packets arriving at a network switch from a plurality of connections and transmitting data packets over a communications link, each of the plurality of connections having a service rate, comprising the steps of:

(a) receiving a plurality of data packets during a period of time, each of the plurality of packets having a length;

(b) calculating an elapsed real-time since a current data packet being transmitted has started transmitting, the elapsed real-time representing a time offset between the arrival time of a newly arrived data packet at said network switch and the time at which the current data packet started transmitting, and adding the elapsed real time to the previous system potential in order to obtain a system potential as each of the plurality of data packets arrives at said network switch;

(c) retrieving a timestamp of a prior data packet that arrived from a same connection as an incoming data packet, the timestamp of the prior data packet being reset to zero when there are no data packets to transmit from any of the plurality of connections, defining a starting potential for the incoming data packet as a maximum value of the timestamp of the prior data packet and the system potential, and dividing the length of the incoming data packet by the service rate of the connection associated with the incoming data packet and adding the result of the division to the starting potential in order to obtain the timestamp; and (d) storing data packets in a packet queue and transmitting the data packets from the packet queue according to their respective timestamps.

2. The method as recited in claim 1 wherein the system potential is zero when none of the plurality of data packets are being transmitted and wherein the system potential increases as the plurality of data packets are transmitted.

3. The method as recited in claim 1 wherein an entry is maintained for the arriving data packet in a separate starting-potential queue ordered by the starting potential.

4. The method as recited in claim 3 further comprising the steps of:

(d) increasing the system potential by a transmission time of the most recently transmitted packet;

(e) performing a system-potential update operation comprising the steps of:
  (i) comparing the system potential with the starting potential of a packet appearing at a head of the starting-potential queue;
  (ii) if the system potential is less than the starting potential of the packet appearing at the head of the starting-potential queue, recalibrating the system potential by setting it equal to the starting potential appearing at the head of the starting-potential queue; and (f) recording the current time for use in calculating the system potential.

5. The method as recited in claim 1 wherein data packets comprise ATM cells and wherein the step of calculating a starting potential and a timestamp comprises the steps of:

(a) retrieving a prior timestamp of a prior ATM cell that arrived from the same connection as an incoming ATM cell, the prior timestamp being reset to zero when there are no ATM cells to transmit from any of the connections;

(b) defining a starting potential for the incoming ATM cell as a maximum of the prior timestamp and system potential, said system potential having an integer value;

(c) increasing the system potential by the transmission time of the most recently transmitted ATM cell by adding the scaling constant K to the system potential;

(d) performing a system-potential update operation comprising the steps of:
  (i) comparing the system potential with the starting potential of the ATM cell appearing at a head of the starting-potential queue; and
  (ii) if system potential is less than the starting potential of the ATM cell appearing at the head of the starting-potential queue, recalibrating the system potential by setting it equal to the starting potential appearing at the head of the starting-potential queue;

(e) recording the current time for use in calculating the system potential;

(f) associating a positive integer scaling constant K for scaling the bandwidth reservations of the connections; and (g) adding an inverse of the service rate of the connection associated with the incoming ATM cell, multiplied by the scaling constant K, to the starting-potential to obtain a new timestamp for the arriving ATM cell.

arriving ATM cell in a separate starting-potential queue ordered by the starting potential.

6. The method as recited in claim 5 wherein an entry is maintained for the arriving ATM cell in a separate starting-potential queue ordered by the starting potential.

7. The method as recited in claim 1 wherein the plurality of data packets comprise ATM cells, wherein the time period during which the ATM cells are received is divided into a plurality of slots, each of the plurality of slots having a corresponding timestamp, each of the plurality of slots having a number, each of the plurality of slots having a state, the state including full and empty, and wherein the step of storing ATM cells in the cell queue comprises the steps of:

(a) allocating a buffer location in the cell queue as a storage location for an arriving ATM cell;

(b) determining if any ATM cell that arrived from the same connection as the arriving ATM cell is currently in the cell queue;

(c) if the cell queue does not contain any ATM cell that arrived from the same connection as the arriving ATM cell,
  (i) finding the slot number corresponding to the timestamp value of the arriving ATM cell,
  (ii) adding the arriving ATM cell to a list of cells currently maintained for a slot having the slot number, and
  (iii) setting the state of slot to full; and (d) adding the arriving ATM cell to the cell queue of the same connection.

8. The method as recited in claim 1 wherein the time period during which the plurality of data packets is received is divided into a plurality of slots, each of the plurality of slots having a corresponding timestamp, each of the plurality of slots having a number, each of the plurality of slots having a state, the state including full and empty, wherein data packets comprise ATM cells, and wherein the step of transmitting ATM cells from the cell queue comprises the steps of:

(a) providing an array of slots which indicate which of the plurality of different connections contain ATM cells for transmission;

(b) scanning for the first full slot starting from one of the slots corresponding to a current frame in progress, the first full slot indicating that one of plurality of connections has an ATM cell for transmission;

(c) retrieving for transmission an ATM cell from a list corresponding to the first full slot;

(d) if the retrieved ATM cell was a last ATM cell in the list, setting the state of the slot to empty so that a future scan of slots will indicate that the slot is empty; and (e) if more ATM cells from a connection corresponding to the first full slot exist,
  (i) locating the next ATM cell from the connection,
  (ii) obtaining the timestamp of the next ATM cell,
  (iii) determining the slot number corresponding to the obtained timestamp, and
  (iv) adding the next ATM cell to a list of slots corresponding to the slot number.

9. A method for scheduling the transmission of data packets in a packet switch having an input port and an output port wherein individual application sessions share an outgoing communications link, comprising the steps of:

(a) receiving a plurality of data packets;

(b) determining a system potential as a function of network activity, the system potential being zero when there are no packets to send on the outgoing communications link and increasing in real time as packets are transmitted;

(c) recalibrating the system potential at the end of transmission of each packet;

(d) timestamping each packet on arrival at the output port based on the system potential and the timestamp of the previous packet of the same session;

(e) storing packets in a packet queue, wherein the packets are ordered according to their timestamps, and wherein the packet with the smallest timestamp value is placed at the head of the packet queue;

(f) adding an entry for the packet in a starting-potential queue, wherein the packet with the smallest starting-potential value is placed at the head of the starting-potential queue; and (g) transmitting the packet having the smallest timestamp.

10. A priority queue method for selecting for transmission ATM cells arriving at an ATM network switch from a plurality of different connections wherein a timestamp value is assigned to each of plurality of ATM cells based on a system potential, wherein ATM cells are stored in a queue in a sequential order according to their timestamps, wherein the time period during which ATM cells are received is divided into W individual slots, each slot having a corresponding timestamp, comprising the steps of:

(a) providing a state array means for indicating the presence of queued cells with an associated timestamp value, the state array means including a plurality of storage elements corresponding to slots, at least one storage element corresponding to each timestamp value, (b) an array of head pointers, one head pointer per slot, each head pointer pointing to at least one ATM cell with a time stamp value corresponding to a slot number; and (c) scanning storage elements and selecting an ATM cell having the smallest timestamp value for transmission.

11. The method as recited in claim 10 wherein each slot has an empty state where there is no ATM cell queued with a timestamp value corresponding to the slot, and wherein each slot has a full state when there is an ATM cell queued with a timestamp value corresponding to the slot.

12. The method as recited in claim 11 further comprising the step of scanning storage elements and selecting for transmission an ATM cell in the first slot having a full state.

13. A starting-potential queue method for determining the minimum starting potential of ATM cells queued in an ATM network switch from a plurality of different connections, wherein the starting potentials of ATM cells are stored in a queue in a sequential order according to their starting potential values, wherein the time period during which ATM cells are received is divided into W individual slots, each slot having a corresponding starting potential comprising the steps of:

(a) providing a state array means for indicating the presence of queued cells with an associated starting-potential value, the state array means including a plurality of storage elements corresponding to the slots, at least one storage element corresponding to each starting-point value;

(b) providing a set of counters for indicating the number of queued cells with an associated starting-potential value, with at least one counter corresponding to each starting-potential value; and (c) scanning storage elements and selecting the smallest starting-potential value.

14. A method of determining the lowest starting potential of a queued ATM cell, wherein the time period during which a plurality of data packets are received is divided into slots, each of the slots having a corresponding starting-potential, each of the slots having a number, each of the slots having a state, the state including full and empty, wherein data packets comprise a plurality of ATM cells, the method comprising the steps of:

(a) providing an array of slots which indicate which of the plurality of different connections contain ATM cells for transmission;

(b) scanning for a first full slot starting from one of the slots corresponding to a first-slot pointer, the first full slot indicating that one of the connections has an ATM cell for transmission; and (c) retrieving the starting potential of the ATM cell corresponding to the first full slot.

15. A method for updating the starting-potential queue on transmission of a cell, wherein the time period during which data packets are received is divided into slots, each slot having a corresponding starting-potential value, each slot having a number, each slot having a state, the state including full and empty, wherein data packets comprise ATM cells, the method comprising the steps of:

(a) locating the slot corresponding to the ATM cell just transmitted;

(b) decrementing the counter associated with the slot;

(c) setting the state of the slot to empty if the counter is zero; and (d) if more ATM cells exist from the connection corresponding to the cell that was just transmitted;
  (i) locating the next ATM cell from the same connection,
  (ii) calculating the starting-potential of the next ATM cell,
  (iii) determining the slot number corresponding to obtained starting potential; and
  (iv) incrementing the counter corresponding to the slot number.

16. A scheduling system for receiving a plurality of data packets arriving at a network switch from a plurality of connections and transmitting data packets over a communications link, each of the plurality of connections having a service rate, comprising:

(a) means for receiving a plurality of data packets during a period of time, each of the plurality of packets having a length;

(b) means for calculating an elapsed real-time since a current data packet being transmitted has started transmitting, the elapsed real-time representing a time offset between the arrival time of newly arriving data packet at said network switch and the time at which the current data packet started transmitting, and means for adding the elapsed real time to the previous system potential in order to obtain a system potential as each of a plurality of data packets arrives at said network switch;

(c) means for retrieving a timestamp of a prior data packet that arrived from a same connection as an incoming data packet, the timestamp of the prior data packet being reset to zero when there are no data packets to transmit from any of the plurality of connections, means for defining a starting potential for the incoming data packet as a maximum value of the timestamp of the prior data packet and the system potential, and means for dividing the length of incoming data packet by the service rate of the connection associated with incoming data packet and adding the result of the division to a starting potential in order to obtain timestamp; and (d) means for storing data packets in a packet queue and transmitting the data packets from packet queue according to their timestamps.

17. The system as recited in claim 16 wherein the system potential is zero when none of the plurality of data packets are being transmitted and wherein the system potential increases as the plurality of data packets are transmitted.

18. The system as recited in claim 16 wherein an entry is maintained for the arriving data packet in a separate starting-potential queue ordered by the starting potential.

19. The system as recited in claim 18 further comprising:

(a) means for increasing the system potential by a transmission time of the most recently transmitted packet;

(b) means for performing a system-potential update operation comprising:

(i) means for comparing the system potential with the starting potential of a packet appearing at a head of the starting-potential queue;

(ii) means for recalibrating the system potential by setting it equal to the starting potential appearing at the head of the starting-potential queue, if the system potential is less than the starting potential of the packet appearing at the head of the starting-potential queue; and (c) means for recording the current time for use in calculating the system potential.

20. The system as recited in claim 18 wherein an entry is maintained for the arriving ATM cell in a separate starting-potential queue ordered by the starting potential.

21. The system as recited in claim 20 wherein the system potential has an integer value and further comprising:

(a) means for increasing the system potential by the transmission time of the most recently transmitted ATM cell by adding the scaling constant K to the system potential;

(b) means for performing a system-potential update operation, the system potential update operation providing means further comprising:

(c) means for comparing the system potential with the starting potential of the ATM cell appearing at a head of the starting-potential queue;

(d) means for recalibrating the system potential by setting it equal to the starting potential appearing at the head of the starting-potential queue if system potential is less than the starting potential of the ATM cell appearing at the head of the starting-potential queue; and (e) means for recording the current time for use in calculating the system potential.

22. The system as recited in claim 16 wherein the data packets comprise ATM cells and wherein the starting potential and timestamp calculating means comprises:

(a) means for retrieving a prior timestamp of a prior ATM cell that arrived from the same connection as an incoming ATM cell, the prior timestamp being reset to zero when there are no ATM cells to transmit from any of the connections;

(b) means for defining a starting potential for the incoming ATM cell as a maximum of the prior timestamp and system potential, said system potential having an integer value;

(c) means for increasing the system potential by the transmission time of the most recently transmitted ATM cell by adding the scaling constant K to the system potential;

(d) means for performing a system-potential update operation, comprising:

(i) means for comparing the system potential with the starting potential of the ATM cell appearing at a head of the starting-potential queue; and (ii) means for recalibrating the system potential by setting it equal to the starting potential appearing at the head of the starting-potential queue if system potential is less than the starting potential of the ATM cell appearing at the head of the starting-potential queue;

(e) means for recording the current time for use in calculating the system potential;

(f) means for associating a positive integer scaling constant for scaling the bandwidth reservations of the connections; and (g) means for adding an inverse of the service rate of the connection associated with incoming ATM cell, multiplied by a scaling constant K, to the starting-potential to obtain a new timestamp for the arriving ATM cell.

23. The system as recited in claim 16 wherein the plurality of data packets comprise ATM cells, wherein the time period during which the ATM cells are received is divided into a plurality of slots, each of the plurality of slots having a corresponding timestamp, each of the plurality of slots having a number, each of the plurality of slots having a state, the state including full and empty, and wherein the storing means comprises:

means for allocating a buffer location in the cell queue as a storage location for an arriving ATM cell;

means for determining if any ATM cell that arrived from the same connection as the arriving ATM cell is currently in the cell queue;

means for finding the slot number corresponding to the timestamp value of the arriving ATM cell; and means for adding the arriving ATM cell to a list of cells currently maintained for a slot having the slot number if the cell queue does not contain any ATM cell that arrived from the same connection as the arriving ATM cell, and means for setting the state of slot to full; and means for adding the arriving ATM cell to the queue of same connection.

24. The system as recited in claim 16 wherein the time period during which the plurality of data packets are received is divided into a plurality of slots, each of the plurality of slots having a corresponding timestamp, each of the plurality of slots having a number, each of the plurality of slots having a state, state including full and empty, wherein the data packets comprise ATM cells, and wherein the transmitting means comprises:

means for providing an array of slots which indicate which of the plurality of different connections contain ATM cells for transmission;

means for scanning for the first full slot starting from one of the slots corresponding to a current frame in progress, the first full slot indicating that one of the plurality of connections has an ATM cell for transmission;

means for retrieving for transmission of an ATM cell from a list corresponding to the first full slot;

means for setting the state of the slot to empty so that a future scan of slots will indicate that the slot is empty if the retrieved ATM cell was a last ATM cell in the list;

means for locating the next ATM cell from the connection if more ATM cells from a connection corresponding to the first full slot exist;

means for obtaining the timestamp of the next ATM cell;

means for determining the slot number corresponding to the obtained timestamp; and means for adding the next ATM cell to a list of slots corresponding to the slot number.

25. A system for scheduling the transmission of data packets in a packet switch having an input port and an output port wherein individual application sessions share an outgoing communications link, comprising:

means for receiving a plurality of data packets;

means for determining a system potential as a function of a network activity, the system potential being zero when there are no packets to send on the outgoing communications link and increasing in real time as packets are transmitted;

means for recalibrating the system potential at the end of transmission of each packet;

means for timestamping each packet on arrival at the output port based on the system potential and the timestamp of the previous packet of the same session;

means for storing packets in a packet queue, wherein the packets are ordered according to their timestamps, and wherein the packet with the smallest timestamp value is placed at the head of the packet queue;

means for adding an entry for the packet in a starting-potential queue, wherein the packet with the smallest starting-potential value is placed at the head of the starting-potential queue; and means for transmitting the packet having the smallest timestamp.

26. A priority queue for selecting for transmission ATM cells arriving at an ATM network switch from a plurality of different connections wherein a timestamp value is assigned to each of the ATM cells based on a system potential, wherein the ATM cells are stored in a queue in a sequential order according to their timestamps, wherein the time period during which the ATM cells are received is divided into W individual slots, each slot having a corresponding timestamp, comprising:

means for providing a state array means for indicating the presence of queued cells with an associated timestamp value, the state array means including a plurality of storage elements corresponding to slots, at least one storage element corresponding to each timestamp value, wherein the ATM cells are stored in storage elements;

means for providing an array of head pointers, one head pointer per slot, each head pointer pointing to at least one ATM cell with a time stamp value corresponding to a slot number; and means for scanning storage elements and selecting an ATM cell having the smallest timestamp value for transmission.

27. The priority queue as recited in claim 26 wherein each slot has an empty state where there is no ATM cell queued with a timestamp value corresponding to the slot, and wherein each slot has a full state when there is an ATM cell queued with a timestamp value corresponding to the slot.

28. The priority queue as recited in claim 26 further comprising scanning storage elements and selecting for transmission an ATM cell in the first slot having a full state.

29. A starting-potential queue for determining the minimum starting potential of ATM cells queued in an ATM network switch from a plurality of different connections, wherein the starting potentials of ATM cells are stored in a queue in a sequential order according to their starting potential values, wherein the time period during which ATM cells are received is divided into W individual slots, each slot having a corresponding starting potential comprising:

means for providing a state array means for indicating the presence of queued cells with an associated starting-potential value, the state array means including a plurality of storage elements corresponding to the slots, at least one storage element corresponding to each starting-point value;

means for providing a set of counters for indicating the number of queued cells with an associated starting-potential value, with at least one counter corresponding to each starting-potential value; and means for scanning storage elements and selecting the smallest starting-potential value.

30. A system of determining the lowest starting potential of a queued ATM cell, wherein the time period during which a plurality of data packets are received is divided into slots, each of the slots having a corresponding starting-potential, each of the slots having a number, each of the slots having a state, state including full and empty, wherein data packets comprise a plurality of ATM cells, the system comprising:

means for providing an array of slots which indicate which of the plurality of different connections contain ATM cells for transmission;

means for scanning for a first full slot starting from one of the slots corresponding to a first-slot pointer, the first full slot indicating that one of connections has an ATM cell for transmission; and means for retrieving the starting potential of the ATM cell corresponding to the first full slot.

31. A system for updating the starting-potential queue on transmission of a cell, wherein the time period during which data packets are received is divided into slots, each slot having a corresponding starting-potential value, each slot having a number, each slot having a state, the state including full and empty, wherein data packets comprise ATM cells, the system comprising:

means for locating the slot corresponding to the ATM cell just transmitted;

means for decrementing the counter associated with the slot;

means for setting the state of the slot to empty if the counter becomes zero; and means for locating the next ATM cell from the connection;

means for calculating the starting-potential of the next ATM cell;

means for determining the slot number corresponding to the obtained starting potential; and means for incrementing the counter corresponding to slot number if more ATM cells exist from the connection corresponding to the cell that was just transmitted.

32. A scheduling method for receiving a plurality of data packets arriving at a network switch from a plurality of connections and transmitting data packets over a communications link, each of the plurality of connections having a service rate, comprising the steps of:

(a) receiving a plurality of data packets during a period of time, each of the plurality of packets having a length;

(b) calculating a global variable as each of the plurality of data packets arrives at a switch;

(c) calculating a timestamp for each of the plurality of data packets based on the global variable; and (d) storing data packets in a packet queue and transmitting the data packets from the packet queue according to their timestamps.

33. A scheduling system for receiving a plurality of data packets arriving at a network switch from a plurality of connections and transmitting data packets over a communications link, each of the plurality of connections having a service rate, comprising:

means for receiving a plurality of data packets during a period of time, each of the plurality of packets having a length;

means for calculating a global variable as each of the plurality of data packets arrives at a switch;

means for calculating a timestamp for each of the plurality of data packets based on the global variable; and means for storing data packets in a packet queue and transmitting the data packets from the packet queue according to their timestamps.

* * * * *

UNITED STATES PATENT AND TRADEMARK OFFICE
CERTIFICATE OF CORRECTION

PATENT NO. : 6,134,217  
DATED : October 17, 2000  
INVENTOR(S) : Dimitrios Stiliadis; Anujan Varma Page 1 of 1

It is certified that error appears in the above-identified patent and that said Letters Patent is hereby corrected as shown below:

<u>Column 1,</u>  
Line 12, insert

-- GOVERNMENT SUPPORT

This invention was made with Government support under Grant Nos. MIP9257103 and ECS9319918, awarded by the National Science Foundation. The Government has certain rights in this invention. --

Signed and Sealed this

Fifth Day of February, 2002

Attest:

JAMES E. ROGAN  
*Attesting Officer*  *Director of the United States Patent and Trademark Office*